(12) United States Patent
Page et al.

(10) Patent No.: US 11,897,601 B2
(45) Date of Patent: Feb. 13, 2024

(54) AIRCRAFT AND METHODS OF USE FOR AERODYNAMIC CONTROL WITH WINGLET SURFACES

(71) Applicant: JETZERO, Inc., Orange, CA (US)

(72) Inventors: Mark Allan Page, Orange, CA (US); Blaine Knight Rawdon, Orange, CA (US)

(73) Assignee: JetZero, Inc., Long Beach, CA (US)

( * ) Notice: Subject to any disclaimer, the term of this patent is extended or adjusted under 35 U.S.C. 154(b) by 0 days.

(21) Appl. No.: 17/672,860

(22) Filed: Feb. 16, 2022

(65) Prior Publication Data

US 2023/0257108 A1    Aug. 17, 2023

(51) Int. Cl.
| | | |
|---|---|---|
| B64C 23/06 | (2006.01) | |
| B64C 39/10 | (2006.01) | |
| B64C 9/06 | (2006.01) | |
| B64C 13/24 | (2006.01) | |

(52) U.S. Cl.
CPC .............. *B64C 23/076* (2017.05); *B64C 9/06* (2013.01); *B64C 39/10* (2013.01); *B64C 13/24* (2013.01); *B64C 2039/105* (2013.01)

(58) Field of Classification Search
CPC ......... B64C 23/076; B64C 9/06; B64C 39/10; B64C 3/24; B64C 2039/105; Y02T 50/10
See application file for complete search history.

(56) References Cited

U.S. PATENT DOCUMENTS

| | | |
|---|---|---|
| 7,744,038 B2 | 6/2010 | Sankrithi et al. |
| 7,793,884 B2 | 9/2010 | Dizdarevic et al. |
| 8,123,160 B2 | 2/2012 | Shepshelovich et al. |
| 8,387,922 B2 | 3/2013 | Breitsamter et al. |
| 8,788,122 B1 | 7/2014 | Sankrithi et al. |
| 10,640,212 B1 | 5/2020 | Dizdarevic |
| 11,072,423 B1* | 7/2021 | Robertson ................. B64C 9/18 |
| 2008/0308683 A1* | 12/2008 | Sankrithi ............... B64C 23/076 244/199.4 |
| 2010/0006706 A1* | 1/2010 | Breitsamter ............ B64C 13/16 701/4 |

(Continued)

FOREIGN PATENT DOCUMENTS

| | | |
|---|---|---|
| EP | 2233395 A1 | 9/2010 |
| WO | 2021005595 | 1/2021 |
| WO | 2021201927 | 10/2021 |

OTHER PUBLICATIONS

Hageman, R., Rudder Incorporated Winglet Design for Blended Wing Body Aircraft, Nov. 22, 2016.

(Continued)

*Primary Examiner* — Medhat Badawi
*Assistant Examiner* — Vicente Rodriguez
(74) *Attorney, Agent, or Firm* — Caldwell Intellectual Property Law

(57) ABSTRACT

Aspects relate to aircraft and methods of use for aerodynamic control with winglet surfaces. In an aspect an exemplary aircraft includes a first wing having a first winglet at a distal end of the wing, wherein the first winglet comprises at least a first control surface at a first trailing edge of the first winglet and a second wing having a second winglet at a distal end of the wing, wherein the second winglet comprises at least a second control surface at a second trailing edge of the second winglet.

20 Claims, 9 Drawing Sheets

(56) References Cited

U.S. PATENT DOCUMENTS

| | | | |
|---|---|---|---|
| 2011/0024556 A1* | 2/2011 | Cazals | B64C 23/076 |
| | | | 244/99.12 |
| 2011/0121130 A1* | 5/2011 | Odle | B64C 1/22 |
| | | | 244/36 |
| 2012/0267472 A1* | 10/2012 | Pratzovnick | H04K 3/825 |
| | | | 244/119 |
| 2020/0207460 A1* | 7/2020 | Page | B64C 39/10 |
| 2020/0283130 A1 | 9/2020 | Guida | |

OTHER PUBLICATIONS

R. H. Liebeck, Design of the blended wing body subsonic transport, Feb. 29, 2004.
Ignazio Dimino, Electromechanical Actuation for Morphing Winglets, Feb. 25, 2019.
Taras Kiceniuk Sr, Icarus 5, Aug. 1973.

* cited by examiner

AIRCRAFT AND METHODS OF USE FOR AERODYNAMIC CONTROL WITH WINGLET SURFACES

FIELD OF THE INVENTION

The present invention generally relates to the field of aircraft. In particular, the present invention is directed to aircraft and methods of use for aerodynamic control with winglet surfaces.

BACKGROUND

Blended wing body aircraft exhibit a number of fuel and noise saving advantages. Reduced fuel consumption or fuel from renewable sources is increasingly important as the effects of global warming are becoming better understood. However, the aerodynamic properties of blended wing aircraft which facilitate these advances in fuel savings, when practically applied can preclude use of conventional control surfaces, including the rudder on a conventional tailfin of most fixed wing aircraft.

SUMMARY OF THE DISCLOSURE

In an aspect an exemplary aircraft includes a first wing having a first winglet at a distal end of the wing, wherein the first winglet comprises at least a first control surface at a first trailing edge of the first winglet and a second wing having a second winglet at a distal end of the wing, wherein the second winglet comprises at least a second control surface at a second trailing edge of the second winglet.

In another aspect embodiments relate to an exemplary method of using an aircraft including a first wing having a first winglet at a distal end of the wing, wherein the first winglet includes at least a first control surface at a first trailing edge of the first winglet and a second wing having a second winglet at a distal end of the wing, wherein the second winglet includes at least a second control surface at a second trailing edge of the second winglet. The exemplary method includes driving, by a controller incorporated in the aircraft, at least a first actuator to move the at least a first control surface; and driving, by the controller, at least a second actuator to move the at least a second control surface.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to aircraft and methods of use for aerodynamic control with winglet surfaces. In an embodiment, aircraft includes a blended wing body aircraft. For the purposes of this disclosure, a "blended wing body aircraft" is an aircraft having a blended wing body. As used in this disclosure, A "blended wing body" (BWB), also known as a "blended body" or a "hybrid wing body" (HWB), is a fixed-wing aircraft body having no clear demarcation between wings and a main body of the aircraft along a leading edge of the aircraft.

Aspects of the present disclosure can be used to control flight of an aircraft. Aspects of the present disclosure can also be used to alleviate, counteract, balance, or otherwise mitigate undesirable efforts acting on aircraft, for example wing bending moments or winglet drag forces. This is so, at least in part, because embodiments described in this disclosure may be used not only to introduce flight control forces and moments, but also as to compensate and/or calibrate for flight performance.

Aspects of the present disclosure allow for yaw control on aircraft without a vertical tailfin. Exemplary embodiments illustrating aspects of the present disclosure are described below in the context of several specific examples.

In the following description, for the purposes of explanation, numerous specific details are set forth in order to provide a thorough understanding of the present invention. For purposes of description herein, relating terms, including "upper," "lower," "left," "rear," "right," "front," "vertical," "horizontal," and derivatives thereof relate to embodiments oriented as shown for exemplary purposes in FIG. 4. Furthermore, there is no intention to be bound by any expressed or implied theory presented in this disclosure.

Figure 1:
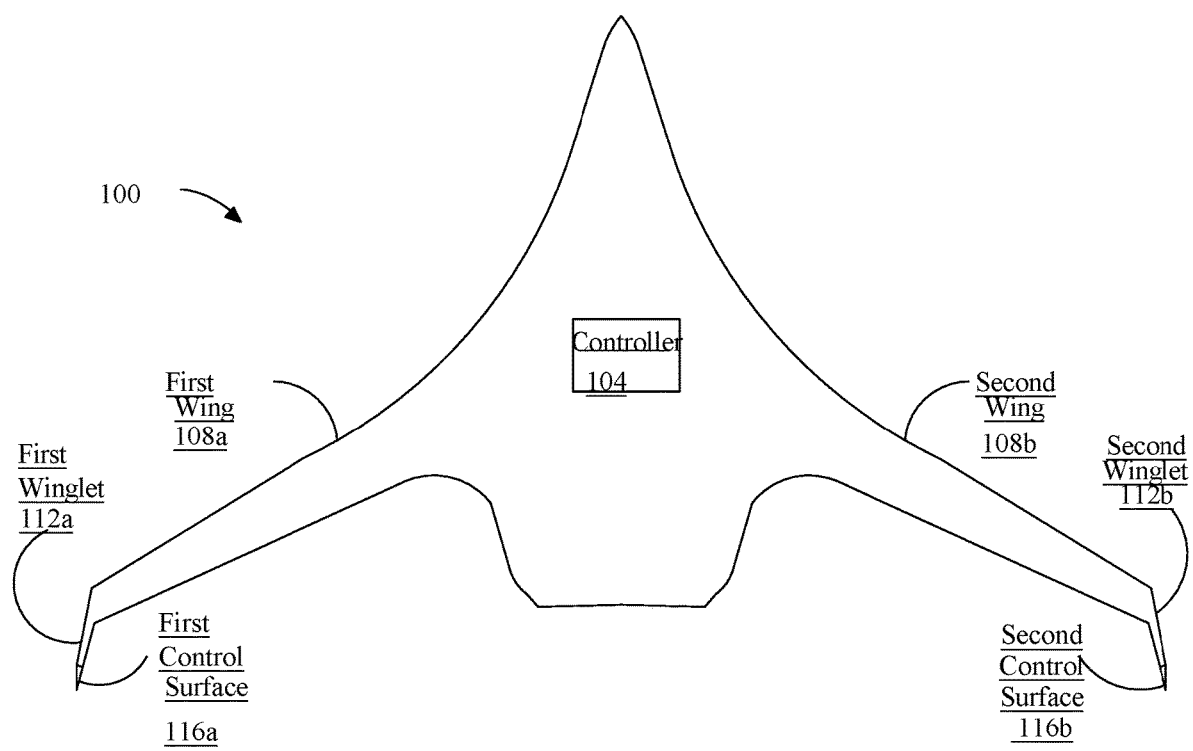
FIG. 1 illustrates a top view of an exemplary aircraft for aerodynamic control with winglet surfaces.

Referring now to FIG. 1, an exemplary embodiment of an aircraft 100 for aerodynamic control with winglet surfaces is illustrated. Aircraft 100 includes a controller 104. Controller 104 may include any controller or flight controller described in this disclosure, including for example with reference to FIG. 4. Controller 104 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Controller 104 may include a single computing device operating independently, or may include two or more computing device operating in concert, in parallel, sequentially or the like; two or more computing devices may be included together in a single computing device or in two or more computing devices. Controller 104 may interface or communicate with one or more additional devices as described below in further detail via a network interface device. Network interface device may be utilized for connecting controller 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Controller 104 may include but is not limited to, for example, a computing device or cluster of computing devices in a first location and a second computing device or cluster of computing devices in a second location. Controller 104 may include one or more computing devices dedicated to data storage, security, distribution of traffic for load balancing, and the like. Controller 104 may distribute one or more computing tasks as described below across a plurality of computing devices of computing device, which may operate in parallel, in series, redundantly, or in any other manner used for distribution of tasks or memory between computing devices. Controller 104 may be implemented using a "shared nothing" architecture in which data is cached at the worker, in an embodiment, this may enable scalability of system 100 and/or computing device.

With continued reference to FIG. 1, controller 104 may be designed and/or configured to perform any method, method step, or sequence of method steps in any embodiment described in this disclosure, in any order and with any degree of repetition. For instance, controller 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Controller 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, aircraft 100 includes wings 108a-b. As used in this disclosure, a "wing" is an aircraft structure that is configured to generate lift. Aircraft 100 may be a fixed-wing aircraft. Aircraft may include substantially two (or more) wings 108a-b. In some cases, wings 108a-b may include winglets 112a-b. In this disclosure, a "winglet" is a flight component configured to manipulate a fluid medium and is mechanically attached to a wing or aircraft and may alternatively called a "wingtip device." In some cases, a winglet may have an airfoil form. A first wing 108a may have a first winglet 112a at a distal end of the wing. A second wing 108b may have a second winglet 112b at a distal end of the wing.

With continued reference to FIG. 1, aircraft 100 may include control surfaces 116a-b. As used in this disclosure, a "control surface" is any purposefully movable flight component, configured to alter flight of the aircraft, for example by imparting forces on fluids, such as air. Control surfaces 116a-b may include any control surfaces described in this disclosure, for example with reference to FIGS. 2-4. In some cases, control surfaces 116a-b may be location on winglets 112a-b. First winglet 112a may include at least a first control surface 116a, for example at a first trailing edge of the first winglet 112a. Second winglet 112b may include at least a second control surface 116b, for example at a second trailing edge of the second winglet 112b. In some embodiments, at least a first control surface 116a and at least a second control surface 116b may be independently movable. For example, in some cases, an amount of movement (e.g., angular or linear deflection) of first control surface 116a may be independent (i.e., same or different) from an amount of movement of a second control surface 116b. In some embodiments, one or more of at least a first control surface 116a and at least a second control surface 116b may include a rudder.

Still referring to FIG. 1, in some embodiments, one or both of first control surface 116a and second control surface, themselves, each include at least two control surfaces. In some cases, at least two control surfaces per winglet 112a-b may provide redundancy. Redundancy may improve safety, allowing for failure of at least one control surface without a total loss of all control surfaces. In some cases, redundant control surfaces may be controlled in concert with one another or independently from one another. For, example in some cases at least two control surfaces may operate identically, essentially as one control surface. Alternatively or additionally, in some use cases, at least two control surfaces may operate distinctly from one another. As an initial example, in some cases, a single winglet 112a may have two control surfaces 116a; the two control surfaces 116a may each be deflected in opposite directs to induce drag and act like a brake (see FIG. 3D).

Still referring to FIG. 1, in some embodiments, aircraft 100 may include at least a first actuator configured to move at least a first control surface 116a and at least a second actuator configured to move at least a second control surface 116b. In some cases, controller 104 may be configured to control each of at least a first actuator and at least a second actuator, thereby controlling at least a first control surface 116a and at least a second control surface 116b.

Still referring to FIG. 1, as used in this disclosure, an "actuator" is a component that is configured to move and/or control a mechanism, flight component, or system. An actuator may, in some cases, require a control signal and/or a source of energy or power. In some cases, a control signal may be relatively low energy. Exemplary control signal forms include electric potential or current, pneumatic pressure or flow, or hydraulic fluid pressure or flow, mechanical force/torque or velocity, or even human power. In some cases, an actuator may have an energy or power source other than control signal. This may include a main energy source, which may include for example electric power, hydraulic power, pneumatic power, mechanical power, and the like. In some cases, upon receiving a control signal, an actuator responds by converting source power into mechanical motion. In some cases, an actuator may be understood as a form of automation or automatic control.

Still referring to FIG. 1, in some embodiments, actuator may include a hydraulic actuator. A hydraulic actuator may consist of a cylinder or fluid motor that uses hydraulic power to facilitate mechanical operation. Output of hydraulic actuator may include mechanical motion, such as without limitation linear, rotatory, or oscillatory motion. In some cases, hydraulic actuator may employ a liquid hydraulic fluid. As liquids, in some cases. are incompressible, a hydraulic actuator can exert large forces. Additionally, as force is equal to pressure multiplied by area, hydraulic actuators may act as force transformers with changes in area (e.g., cross sectional area of cylinder and/or piston). An exemplary hydraulic cylinder may consist of a hollow cylindrical tube within which a piston can slide. In some cases, a hydraulic cylinder may be considered single acting. Single acting may be used when fluid pressure is applied substantially to just one side of a piston. Consequently, a single acting piston can move in only one direction. In some cases, a spring may be used to give a single acting piston a return stroke. In some cases, a hydraulic cylinder may be double acting. Double acting may be used when pressure is applied substantially on each side of a piston; any difference in resultant force between the two sides of the piston causes the piston to move.

Still referring to FIG. 1, in some embodiments, actuator may include a pneumatic actuator. In some cases, a pneumatic actuator may enable considerable forces to be produced from relatively slight changes in gas pressure. In some cases, a pneumatic actuator may respond more quickly than other types of actuators, for example hydraulic actuators. A pneumatic actuator may use compressible flued (e.g., air). In some cases, a pneumatic actuator may operate on compressed air. Operation of hydraulic and/or pneumatic actuators may include control of one or more valves, circuits, fluid pumps, and/or fluid manifolds.

Still referring to FIG. 1, in some cases, actuator may include an electric actuator. Electric actuator may include any of electromechanical actuators, linear motors, and the like. In some cases, actuator may include an electromechanical actuator. An electromechanical actuator may convert a rotational force of an electric rotary motor into a linear movement to generate a linear movement through a mechanism. Exemplary mechanisms, include rotational to translational motion transformers, such as without limitation a belt, a screw, a crank, a cam, a linkage, a scotch yoke, and the like. In some cases, control of an electromechanical actuator may include control of electric motor, for instance a control signal may control one or more electric motor parameters to control electromechanical actuator. Exemplary non-limitation electric motor parameters include rotational position, input torque, velocity, current, and potential. electric actuator may include a linear motor. Linear motors may differ from electromechanical actuators, as power from linear motors is output directly as translational motion, rather than output as rotational motion and converted to translational motion. In some cases, a linear motor may cause lower friction losses than other devices. Linear motors may be further specified into at least 3 distinct categories, including flat linear motor, U-channel linear motors and tubular linear motors. Linear motors may controlled be directly controlled by a control signal for controlling one or more linear motor parameters. Exemplary linear motor parameters include without limitation position, force, velocity, potential, and current.

Still referring to FIG. 1, in some embodiments, an actuator may include a mechanical actuator. In some cases, a mechanical actuator may function to execute movement by converting one kind of motion, such as rotary motion, into another kind, such as linear motion. An exemplary mechanical actuator includes a rack and pinion. In some cases, a mechanical power source, such as a power take off may serve as power source for a mechanical actuator. Mechanical actuators may employ any number of mechanism, including for example without limitation gears, rails, pulleys, cables, linkages, and the like. In some cases, actuator may include a manual actuator. A manual actuator may be actuated by physical manipulation of an operator (e.g., pilot). In some cases, a manual actuator may be operated by way of a pilot interface. Pilot interface may include any pilot interface described in this disclosure, for example with reference to FIGS. 2-4. Pilot interface may include a switch, a lever, a yoke, a pedal, or the like.

Still referring to FIG. 1, in some embodiments, controller 104 may control at least a control surface 116*a-b* by way of a control signal. As used in this disclosure, a "signal" is any intelligible representation of data, for example from one device to another. A signal may include an optical signal, a hydraulic signal, a pneumatic signal, a mechanical, signal, an electric signal, a digital signal, an analog signal and the like. In some cases, a signal may be used to communicate with a computing device, for example by way of one or more ports. In some cases, a signal may be transmitted and/or received by a computing device for example by way of an input/output port. An analog signal may be digitized, for example by way of an analog to digital converter. In some cases, an analog signal may be processed, for example by way of any analog signal processing steps described in this disclosure, prior to digitization. In some cases, a digital signal may be used to communicate between two or more devices, including without limitation computing devices. In some cases, a digital signal may be communicated by way of one or more communication protocols, including without limitation internet protocol (IP), controller area network (CAN) protocols, serial communication protocols (e.g., universal asynchronous receiver-transmitter [UART]), parallel communication protocols (e.g., IEEE 128 [printer port]), and the like.

Still referring to FIG. 1, in some embodiments, aircraft 100 may include a blended wing body. Blending wing body may include any blended wing body described in this disclosure, for example with reference to FIGS. 2-4. Blended wing body aircraft 100 and construction methods for blended wing body aircraft are described in detail in related co-pending applications. Additional disclosure related to modular manufacturing methods for aircraft may be found in U.S. patent application Ser. No. 17/478,406, filed on 17 Sep. 2021, entitled "SYSTEMS AND METH- ODS FOR MODULAR AIRCRAFT," the entirety of which is incorporated herein by reference. Additional disclosure related to modular molded manufacturing methods for aircraft may be found in U.S. patent application Ser. No. 17/478,493, filed on 17 Sep. 2021, entitled "SYSTEMS AND METHODS FOR MANUFACTURE OF A MODULAR AIRCRAFT," the entirety of which is incorporated herein by reference.

Figure 2A:
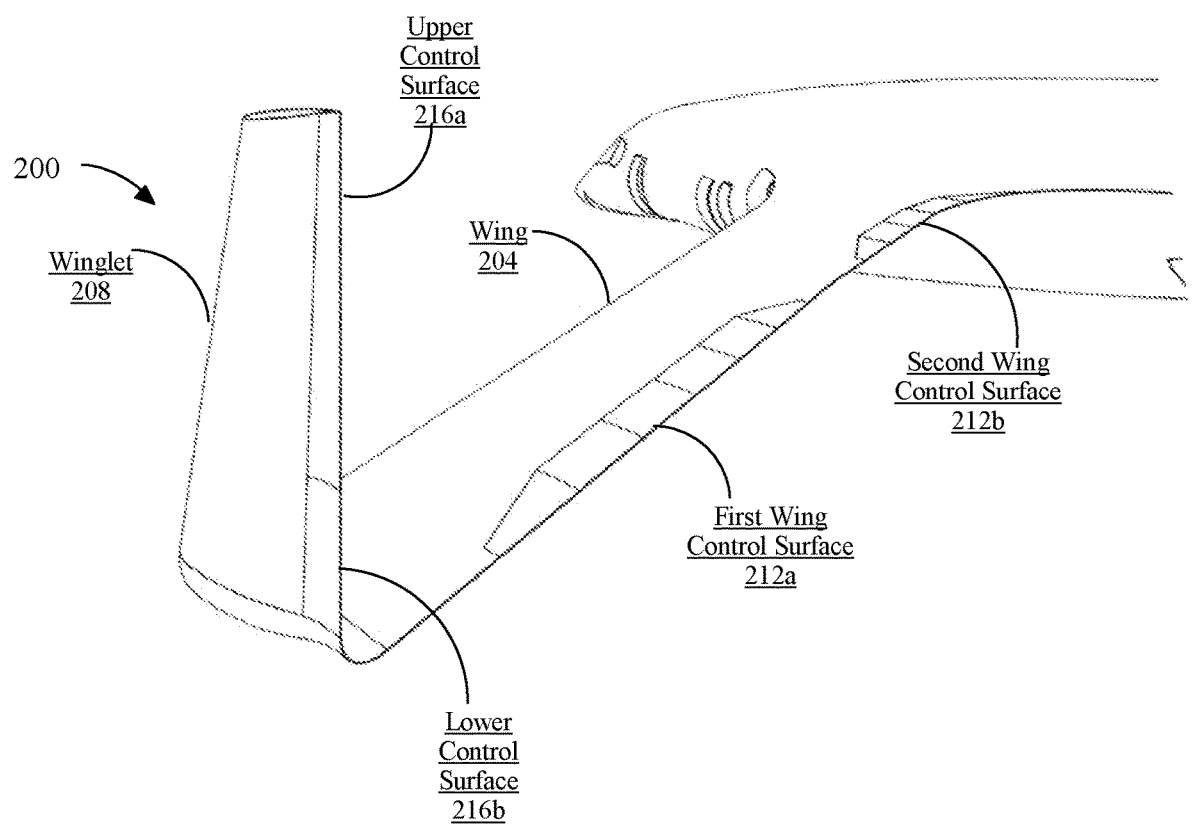
FIG. 2A illustrates a schematic side view of an exemplary aircraft for aerodynamic control with winglet surfaces.

Referring to FIG. 2A, an exemplary aircraft 200 is schematically illustrated. Aircraft may include a wing 204. Wing 204 may include a winglet 208, for instance at a distal end of wing. Winglet 208 may be arranged substantially orthogonally to wing 204, for example vertically up or down from the wing. Wing control surfaces 212a-b are shown at a trailing edge of wing 204. As used in this disclosure "wing control surfaces" are control surfaces substantially located on a wing 204.

With continued reference to FIG. 2A, winglet 208 may include winglet control surfaces 216a-b. As used in this disclosure, "winglet control surfaces" are control surfaces substantially located on a winglet 208. Winglet control surfaces 216a-b may include any control surfaces described in this disclosure, including for example those described in reference to FIG. 4. In some cases, winglet control surfaces 216a-b may include at least two control surface segments (e.g., rudders). For example, winglet control surfaces 216a-b may include an upper control surface 216a and a lower control surface 216b. In some cases, upper control surface 216a may be operated in conjunction with lower control surface 216b, for example deflected substantially the same amount. Alternatively or additionally, in some cases, upper control surface 216a may be operated independently from lower control surface 216b.

Still referring to FIG. 2A, in some instances, multiple rudders 216a-b on each winglet may operate together. For example, multiple rudders 216a-b on each winglet may provide redundant systems for safety. Alternatively or additionally, in some embodiments, multiple rudders 216a-b may increase functionality. In some cases, slightly different deflection of each winglet rudders 216a-b can provide fine-tuning of lift distribution, for instance to reduce induced drag. For example, in some cases, airplane may have an aft CG and require additional nose-down pitch trim; in some embodiments, this may be provided with a slight trailing-edge down deflection of outboard ailerons 212a in combination with a trailing-edge-outboard deflection of a lower winglet rudder 216b and a smaller trailing-edge-outboard deflection of upper winglet rudder 216a. In some cases, multiple winglet control surface segments 216a-b may provide a smoothly-tapered lift distribution, which may be favorable, for example to lower induced drag. In some embodiments, multiple outboard ailerons 212a can be fine-tuned in deflection to coordinate with fine-tuned winglet rudder deflection 216a-b. In some cases, tuned deflection of multiple outboard control surface segments may achieve a combined favorable lift distribution and pitch trim. In some cases, winglet rudder 216a-b and aileron 212a-b deflection fine-tuning can be provided by flight control computer, for example based on flight control laws, sensed data, and/or pilot commands.

Still referring to FIG. 2A, in some embodiments, opposing deflection of winglet rudders 216a-b can provide increased induced and parasite (i.e., separation) drag, while avoiding strong coupled moments such as pitch, roll and yaw. In some cases, opposing deflection of winglet rudders 216a-b may be done to increase drag for a rapid descent. In some cases, these deflections can be controlled by flight control computer to provide braking functionality.

Figure 2B:
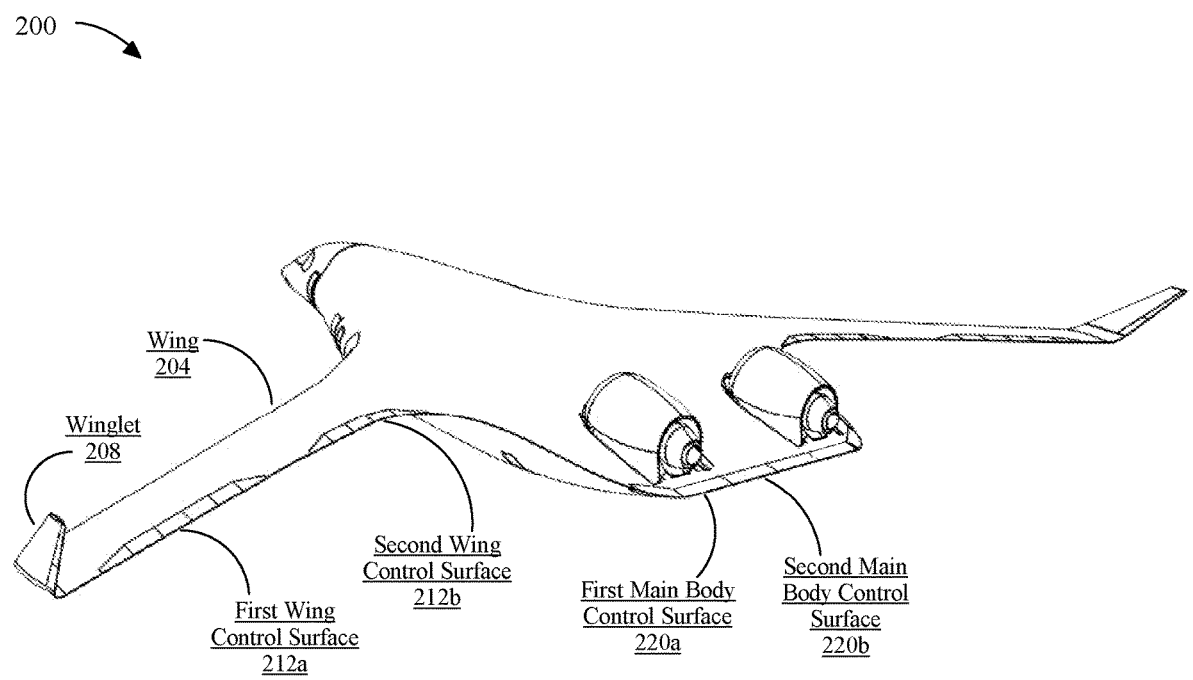
FIG. 2B illustrates a schematic rear view of an exemplary aircraft for aerodynamic control with winglet surfaces.

Referring to FIG. 2B, exemplary aircraft 200 is schematically illustrated. In this view main body control surfaces 220a-b may be seen. A first main body control surface 220a is shown laterally outside of a second main body control surface 220b. Main body control surfaces 220a-b may include a trailing edge of aircraft at main body. Main body control surfaces 220a-b may include elevators which may control pitch of aircraft 200. Alternatively, in some cases aircraft is a conventional (i.e., tube-wing) aircraft, and elevators may be located on a horizontal stabilizer, for example near rear of aircraft.

Figure 2C:
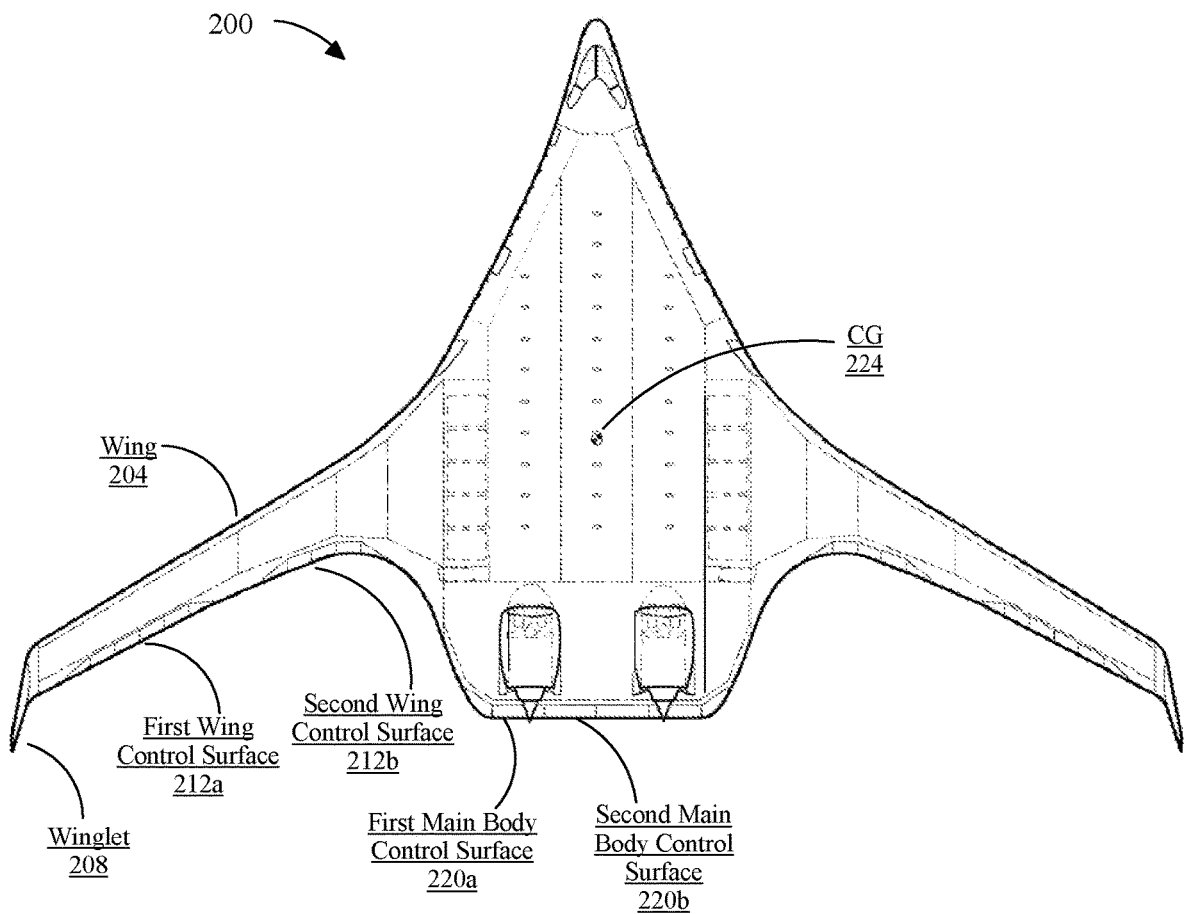
FIG. 2C illustrates a schematic top view of an exemplary aircraft for aerodynamic control with winglet surfaces.

Referring to FIG. 2C, exemplary aircraft 200 is schematically illustrated in a top-down view. In some embodiments, aircraft 200 is substantially laterally symmetric and control surfaces 212a-b, 216a-b, and 220a-b may be located on each side of aircraft. A center of gravity (CG) 224 is shown in FIG. 2C. In some embodiments, aircraft comprises substantially swept wings, such that winglets 208 and/or outboard wings 204 are substantially aft of CG 224. Although presently described with reference to a blended wing body aircraft, aircraft 200 may include any known aircraft including without limitation aft-tailed tube-and-wing aircraft.

Still referring to FIGS. 2A-C, in some embodiments, winglet control surfaces 216a-b (on each winglet) may be deflected together or differentially. Furthermore, any and all control surfaces 212a-b, 216a-b, and/or 220a-b may be operated together or differentially. In some embodiments, one or more of each control surface 212a-b, 216a-b, and/or 220a-b may include at least two control surface segments. At least two control surface segments may provide redundant safety features. Alternatively or additionally, in some embodiments, at least two control surfaces may provide for added control functionality. According to some exemplary embodiments, lift on a flight surface (e.g., wing or winglet) may be approximately proportional to angle of attack. Alternatively or additionally, lift may also be proportional to trailing edge surface deflection. For instance, trailing edge displaced down may provide increased lift (where down is opposite in direction to that of a nominal lift direction.) In some cases, one may estimate that lift resulting from about one degree of control surface trailing edge down deflection is approximately equivalent to lift resulting from about one-half degree of increased angle of attack.

Referring to FIG. 3A-E, a winglet control surface configurations 300a-e is illustrated from a top-down vantage. A first wing 304a and a second wing 304b are each shown with a corresponding first winglet 308a and a second winglet 308b. First winglet 308a and second winglet have a corresponding first winglet control surface 312a and a second winglet control surface 312b. Winglet control surfaces 312a-b may be configured, in some cases, to provide aerodynamic flight control similar to that provided by a rudder on vertical tailfins of conventional tube-wing aircraft. However, in some embodiments, winglet control surfaces may provide additional functions, not typically available with rudders of conventional aircraft.

With continued reference to FIGS. 3A-E, winglet control surface deflection may be understood in substantially three different states (1) no deflection, (2) outboard deflection, and (3) inboard deflection.

(1) No deflection: winglet 308a-b may produce a nominal, desired, steady-state amount of lift suitable for cruise flight. In some embodiments, amount of lift generated by winglet 308a-b may be generally adjusted by winglet incidence and airfoil shape to provide a favorable lift distribution that results in a near optimal (minimal) cruise drag. In some cases, winglet 308a-b setting tends to increase an optimal amount of lift of outboard (flat) wing 304a-b, for instance proximal winglet 308a-b root. In some embodiments without a winglet 308a-b, optimal lift distribution reaches about zero at wing tip. In some embodiments with a winglet 308a-b, lift may be optimally carried at distal portions of wing 304a-b, for instance up to winglet 308a-b root and up to the winglet 308a-b. In some cases (e.g., with a swept wing), additional lift on outboard flat wing 304a-b may be behind airplane CG; this tends to pitch the airplane nose-down. In some cases, this effect may be countered by general design of airplane shape and/or aft tail incidence. In some cases, additional lift on outboard flat wing 304a-b may also tend to roll airplane; however where winglets 308a-b are symmetrically employed, this moment may be countered by an opposing winglet 308a-b and wing 304a-b.

(2) Outboard deflection: assuming winglets 308a-b are directed generally upward (as opposed to downwards), outboard deflection of winglet control surfaces 312a-b may increase winglet 308a-b lift. Increased winglet lift may create a force directed inboard. In some embodiments, where winglet 308a-b is behind CG, a force directed inboard may create a yawing moment toward the winglet control surface 312a-b deflection. (e.g.: If right control surface 312b on right winglet 308b is deflected right [outboard] then airplane may tend to yaw to the right.) In some cases, a force directed inboard may result in a direct side force on airplane, which may accelerate the airplane laterally in a direction opposite of control surface 312a-b deflection. In some cases, increased winglet lift may reduce a pressure on an "upper" (i.e., inboard) side of winglet 308a-b (assuming winglet 308a-b is directed vertically up). In some cases, this reduced pressure may be said to be "in contact" with an upper surface of outboard flat wing 304a-b. As a result, in some embodiments, outboard deflection of a winglet control surface 312a-b may increase lift of a corresponding outboard flat wing portion 304a-b. In embodiments where outboard wing 304a-b is aft of CG, increased outboard wing lift may tend to pitch airplane down. In some embodiments, increased lift at an outboard wing 304a-b may tend to roll airplane, for instance in an opposite direction of winglet control surface 312a-b deflection. (e.g., deflection of right winglet 312b on right winglet 308b to right may tend to roll airplane left.)

(3) Inboard deflection: inboard rudder deflection has approximately opposite effects to outboard rudder deflection, as described above. Again assuming winglets 308a-b are directed vertically upward, inboard winglet control surface 312a-b deflection may reduce winglet 308a-b lift. In some embodiments, extreme inboard winglet control surface deflection may reduce direction of winglet lift to point outboard. In some embodiments, a yawing moment may result in direction of an inboard deflected winglet control surface 312a-b. (e.g., if right winglet control surface 312b on right winglet 308b is deflected left, airplane will tend to yaw nose-left.) In some cases, reduced winglet lift may provide a side force on airplane in a direction opposite to winglet control surface 312a-b deflection. In some cases, reduced winglet lift may also reduce lift on outboard flat portion of wing 304a-b adjacent to the winglet 308a-b. In embodiments where outboard wing portions 304a-b are aft of CG, reduced lift at the outboard wing may tend to pitch airplane nose-up. In some embodiments, reduced winglet lift and/or reduced outboard wing lift may tend to roll airplane, so that the wing with the winglet control surface 312a-b deflected inboard may tend to drop. (e.g., if right winglet control surface 312a-b on right winglet 308a-b is deflected inboard, right wing 304b may tend to drop.)

Figure 3A:
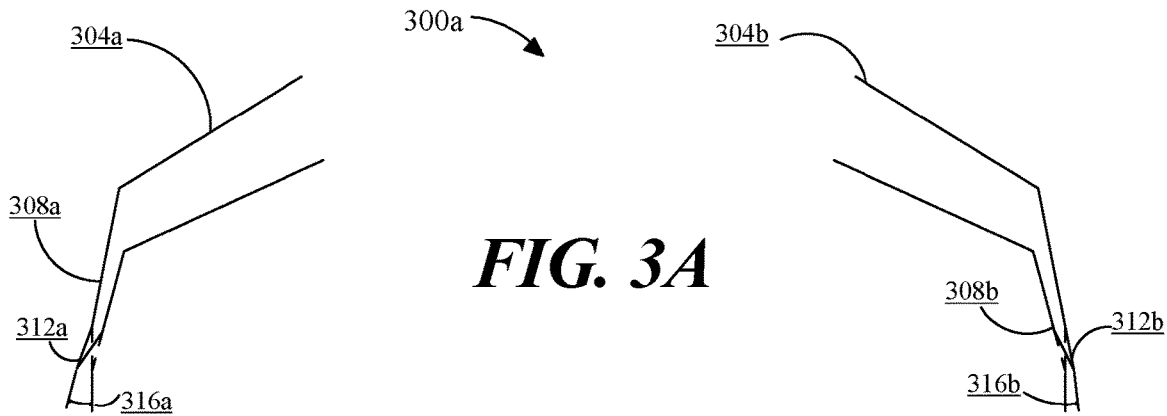
FIG. 3A is a top view illustration of exemplary winglet control surface configuration for aerodynamic compensation.

Referring to FIG. 3A, winglet control surfaces 312a-b are illustrated in a drag adjusting (e.g., increasing or decreasing) configuration 300a. A first winglet control surface 312a has a first deflection 316a, and second winglet control surface 312b has a second deflection 316b. Deflections may be measured from a zero-deflection position where control surface 312a-b is substantially (or nominally) in-line with winglet 308a-b. Deflections of first winglet control surface 312a and second singlet control surface 312b may be substantially similar in magnitude and direction, substantially similar in magnitude and opposite in direction, or completely independent. In some cases, deflections 316a-b may be relatively modest and/or substantially static. For example, in some cases, deflections 316a-b may be considered offset positions or calibrated locations. For instance, in some cases, manufacturing tolerances or the like may impact flight factors, for example drag and/or lift at wing 304a-b or winglet 308a-b. In some cases, compensating deflections 316a-b may adjust for deviations to one or more flight factors, including lift and/or drag. In some embodiments, controller 104 may be configured to control one or more of at least a first actuator and at least a second actuator to adjust drag and/or lift using at least a first control surface 312a and at least a second control surface 312b. In some cases, winglet control surfaces 312a-b may fine-tune performance of winglet (i.e., winglet action), for example to reduce drag and/or lift at off-design flight conditions. In some cases, winglet flight surfaces 312a-b can be used to improve performance at a design condition or off-design flight condition.

Figure 3B:
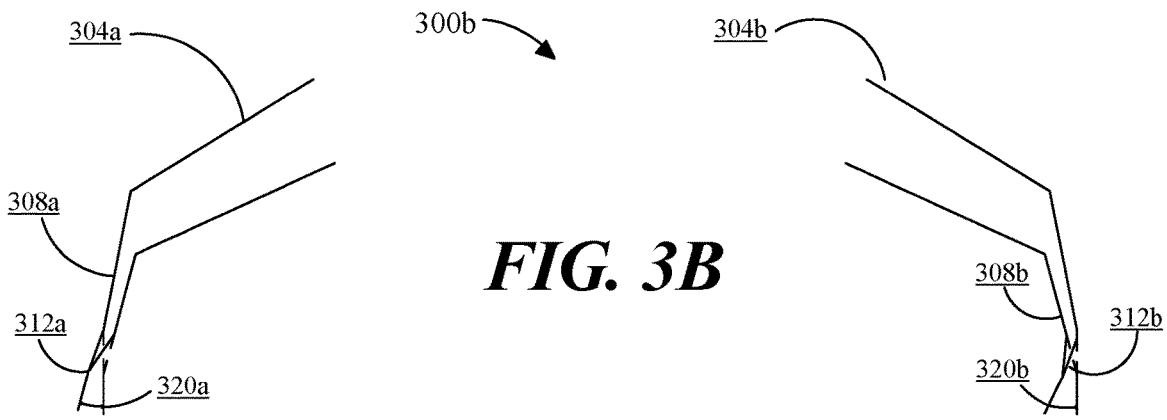
FIG. 3B is a top view illustration of exemplary winglet control surface configuration for yaw.

Referring to FIG. 3B, winglet control surfaces 312a-b are illustrated in a yaw configuration 300b. In some cases, yaw configuration 300b may include a first deflection 320a and a second deflection 320b that are substantially similar in magnitude and direction. In some cases, yaw configuration 300b may be configured to provide similar functionality as a rudder of a vertical tailfin on a conventional aircraft. In some embodiments, controller 104 may be further configured to one or more of at least a first actuator and at least a second actuator to introduce a yaw moment using at least a first control surface 312a and at least a second control surface 312b. In some cases, yaw configuration 300b may provide a yaw moment to support flight maneuvers, including without limitation offset asymmetrical thrust from engines (e.g., one engine inoperative), enable crabbing for crosswind landings, offset adverse yaw from aileron deflection and the like.

Figure 3C:
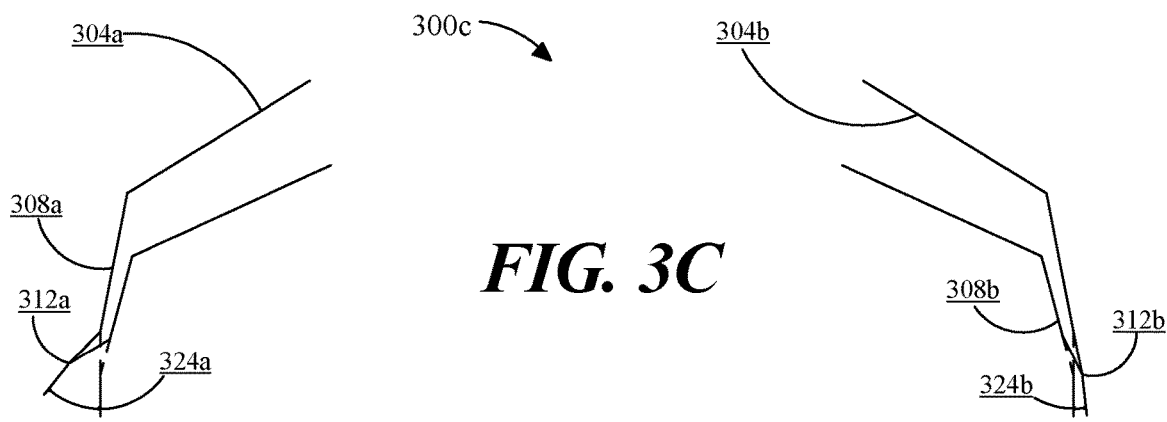
FIG. 3C is a top view illustration of exemplary winglet control surface configuration for side force.

Referring to FIG. 3C, winglet control surfaces 312a-b are illustrated in a side force configuration 300c. In some cases, a side force configuration 300c may include a first deflection 324a which is substantially different (in magnitude and/or direction) than a second deflection 324b. In some embodiments, controller 104 may be further configured to control one or more of at least a first actuator and at least a second actuator to introduce a side force using at least a first control surface 312a and at least a second control surface 312b. In some cases, side force configuration 300c may provide direct side-force. Direct side-force may help facilitate flight maneuvers, for example, to slip sideways and align with a runway during final approach. In some cases, direct side force may also be used to improve ride quality, for instance in case of side-gusts. In some cases, controller 104 may automatically control winglet control surfaces 312a-b, for instance in response to at least a sensor. In some cases, controller 104 may be communicative with an inertial system. Inertial system may include an inertial measurement unit, an accelerometer, a gyroscope, and/or the like. In some cases, controller 104 may automatically introduce a side force, in response to inertial system, for example to reduce lateral acceleration in some flight modes.

Figure 3D:
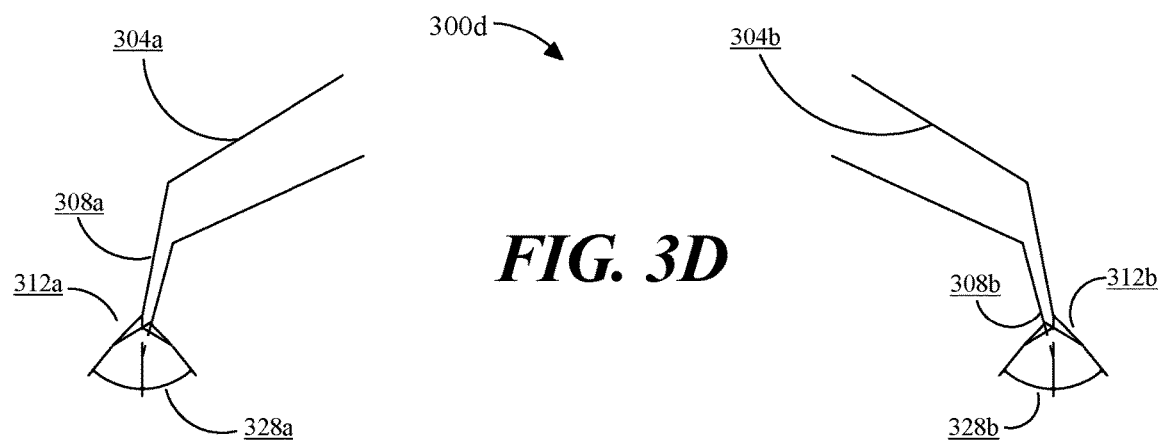
FIG. 3D is a top view illustration of exemplary winglet control surface configuration for braking with induced drag.

Referring to FIG. 3D, winglet control surfaces 312a-b are illustrated in a brake configuration 300d. In some cases, a brake configuration 300d, may include a first deflection 328a and a second deflection 328b which are relatively large in magnitude. In some embodiments, controller 104 may be further configured to control one or more of at least a first actuator and at least a second actuator to introduce drag using at least a first control surface 312a and at least a second control surface 312b. In some cases, at least a first control surface 312a and at least a second control surface 312b each include at least two control surfaces. In some cases, controller 104 may be further configured to introduce drag by moving at least two control surfaces in opposite directions. In some cases, winglet control surfaces 312a-b may induce drag by variations in spanwise lift distribution. In some cases, this may be part of an overall control scheme for airplane. Alternatively or additionally, in some cases, winglet control surfaces 312a-b may induce drag by increasing profile drag, for instance by using large rudder deflections that result in flow separation. As shown in FIG. 3D, at least two rudders 312a-b may be used on each winglet 308a-b. These dual rudders 312a-b can be deflected in opposite directions to avoid a large total force on the winglet while providing a substantial drag increase. In some cases, this may be part of an overall control scheme for airplane (e.g., brake).

Figure 3E:
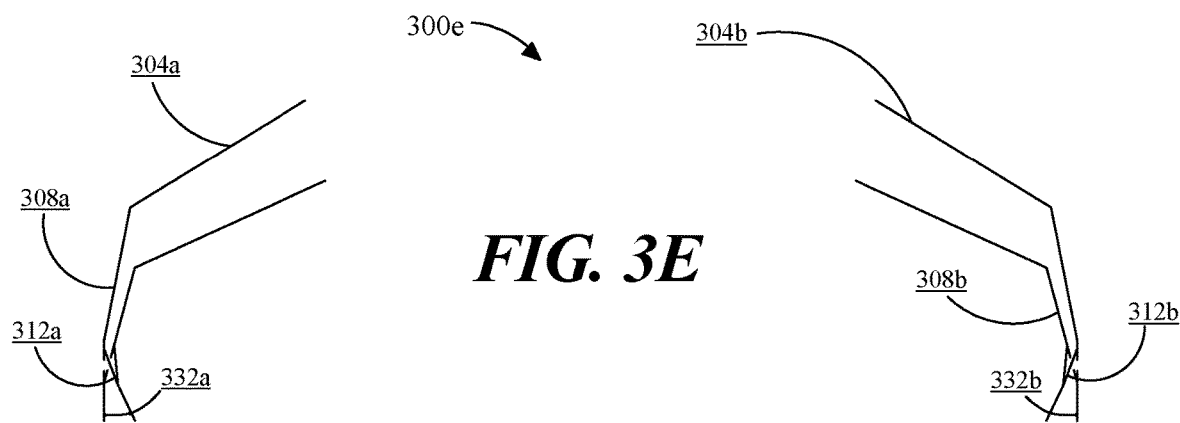
FIG. 3E is a top view illustration of exemplary winglet control surface configuration for wing bending moment compensation.

Referring to FIG. 3E, winglet control surfaces 312a-b are illustrated in a bend relief configuration 300e. In some cases, a bend relief configuration 300e may include a first deflection 332a and a second deflection 332b with substantially similar magnitudes and opposite directions. In some embodiments, controller 104 may be further configured to control each of at least a first actuator and at least a second actuator to compensate wing bending using at least a first control surface 312a and at least a second control surface 312b. As shown in FIG. 3E, in some cases, coordinated deflection 332a-b of substantially similar magnitude and substantially opposite directions may introduce a bending moment to wings 304a-b. In some cases, these deflections 332a-b can be used to reduce wing bending moment in positive (i.e., upward) flight maneuvers. For example, inward deflection 332a-b of winglet rudders 312a-b located above wing 304a-b can reduce wing bending moment. Alternatively or additionally, outward deflection (not shown) of winglet rudders 312a-b on a down-going winglet also relieve wing bending moment in positive maneuvers.

With continued reference to FIGS. 3A-E, a table is provided below with exemplary deflection ranges.

|  | Minimum | Nominal | Maximum |
| --- | --- | --- | --- |
| Drag Adjustment | 0° | 2° | 10° |
| Yaw | 0° | 15° | 40° |
| Side Force | 0° | 15° | 50° |
| Brake | 0° | 15° | 50° |
| Bend Relief | 0° | 10° | 45° |

With continued reference to FIGS. 3A-E, another table is provided below with matrix of winglet control surface direction possibilities. (Mirrored cases omitted for brevity.) Table provides exemplary control functions for winglet control surfaces 312a-b in an exemplary aircraft having swept wings (with winglets 308a-b aft of CG) and winglets directed vertically up from wings. With opposite conditions (e.g., winglets directed vertically down from wings) table values will vary in ways predictable according to this disclosure.

| Left Winglet Rudder | Right Winglet Rudder | Pitch Moment | Roll Moment | Yaw Moment | Lateral Force | Wing Bending Moment | Wing Induced Drag |
| --- | --- | --- | --- | --- | --- | --- | --- |
| Center | Center | Zero | Zero | Zero | Zero | "Nominal" | "Nominal" |
| Center | Right | Down ½ | Left ½ | Right ½ | Left ½ | Same on left, more on right | Modest Increase |
| Right | Right | ~Zero | Left | Right | Left | Less on left, more on right | Increase |
| Right | Left | Up | Zero | Zero | Zero | Less on left and right | Strong Increase |
| Left | Right | Down | Zero | Zero | Zero | More on right and left | Increase |

In some cases, winglet control surfaces may be used in with other control surfaces to aerodynamically control aircraft in flight. An exemplary aircraft 400 with an exemplary flight controller and control surfaces is described with reference to FIG. 4.

Figure 4:
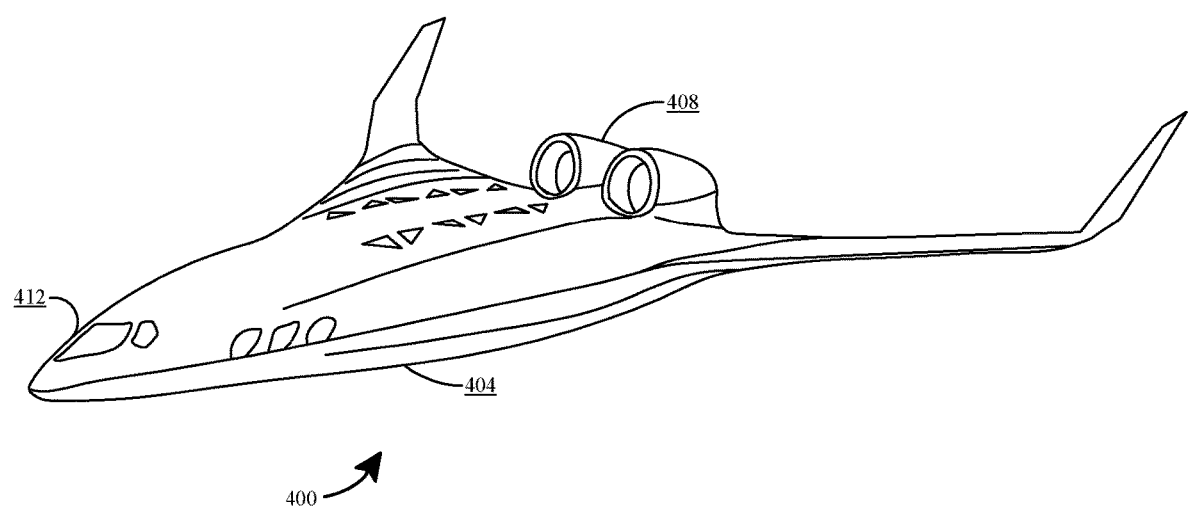
FIG. 4 is a schematic of an exemplary blended wing aircraft.

Referring to FIG. 4, an exemplary blended wing aircraft 400 is illustrated. Aircraft 400 may include a blended wing body 404. For example, a BWB 404 aircraft may have distinct wing and body structures, which are smoothly blended together with no clear dividing line or boundary feature between wing and fuselage. This contrasts with a flying wing, which has no distinct fuselage, and a lifting body, which has no distinct wings. A BWB 404 design may or may not be tailless. One potential advantage of a BWB 404 may be to reduce wetted area and any accompanying drag associated with a conventional wing-body junction. In some cases, a BWB 404 may also have a wide airfoil-shaped body, allowing entire aircraft to generate lift and thereby facilitate reduction in size and/or drag of wings. In some cases, a BWB 404 may be understood as a hybrid shape that resembles a flying wing, but also incorporates features from conventional aircraft. In some cases, this combination may offer several advantages over conventional tube-and-wing airframes. In some cases, a BWB airframe 404 may help to increase fuel economy and create larger payload (cargo or passenger) volumes within the BWB. BWB 404 may allow for advantageous interior designs. For instance, cargo can be loaded and/or passengers can board from the front or rear of the aircraft. A cargo or passenger area may be distributed across a relatively wide (when compared to conventional tube-wing aircraft) fuselage, providing a large usable volume. In some embodiments, passengers seated within an interior of aircraft, real-time video at every seat can take place of window seats.

With continued reference to FIG. 4, BWB 404 of aircraft 400 may include a nose portion. A "nose portion," for the purposes of this disclosure, refers to any portion of aircraft 400 forward of the aircraft's fuselage 416. Nose portion may comprise a cockpit (for manned aircraft), canopy, aerodynamic fairings, windshield, and/or any structural elements required to support mechanical loads. Nose portion may also include pilot seats, control interfaces, gages, displays, inceptor sticks, throttle controls, collective pitch controls, and/or communication equipment, to name a few. Nose portion may comprise a swing nose configuration. A swing nose may be characterized by an ability of the nose to move, manually or automatedly, into a differing orientation than its flight orientation to provide an opening for loading a payload into aircraft fuselage from the front of the aircraft. Nose portion may be configured to open in a plurality of orientations and directions.

With continued reference to FIG. 4, BWB 404 may include at least a structural component of aircraft 400. Structural components may provide physical stability during an entirety of an aircraft's 400 flight envelope, while on ground, and during normal operation Structural components may comprise struts, beams, formers, stringers, longerons, interstitials, ribs, structural skin, doublers, straps, spars, or panels, to name a few. Structural components may also comprise pillars. In some cases, for the purpose of aircraft cockpits comprising windows/windshields, pillars may include vertical or near vertical supports around a window configured to provide extra stability around weak points in a vehicle's structure, such as an opening where a window is installed. Where multiple pillars are disposed in an aircraft's 400 structure, they may be so named A, B, C, and so on named from nose to tail. Pillars, like any structural element, may be disposed a distance away from each other, along an exterior of aircraft 400 and BWB 404. Depending on manufacturing method of BWB 404, pillars may be integral to frame and skin, comprised entirely of internal framing, or alternatively, may be only integral to structural skin elements. Structural skin will be discussed in greater detail below.

With continued reference to FIG. 4, BWB 404 may include a plurality of materials, alone or in combination, in its construction. At least a BWB 404, in an illustrative embodiment may include a welded steel tube frame further configured to form a general shape of a nose corresponding to an arrangement of steel tubes. Steel may include any of a plurality of alloyed metals, including but not limited to, a varying amount of manganese, nickel, copper, molybdenum, silicon, and/or aluminum, to name a few. Welded steel tubes may be covered in any of a plurality of materials suitable for aircraft skin. Some of these may include carbon fiber, fiberglass panels, cloth-like materials, aluminum sheeting, or the like. BWB 404 may comprise aluminum tubing mechanically coupled in various and orientations. Mechanical fastening of aluminum members (whether pure aluminum or alloys) may comprise temporary or permanent mechanical fasteners appreciable by one of ordinary skill in the art including, but not limited to, screws, nuts and bolts, anchors, clips, welding, brazing, crimping, nails, blind rivets, pull-through rivets, pins, dowels, snap-fits, clamps, and the like. BWB 404 may additionally or alternatively use wood or another suitably strong yet light material for an internal structure.

With continued reference to FIG. 4, aircraft 400 may include monocoque or semi-monocoque construction. BWB 404 may include carbon fiber. Carbon fiber may include carbon fiber reinforced polymer, carbon fiber reinforced plastic, or carbon fiber reinforced thermoplastic (e.g., CFRP, CRP, CFRTP, carbon composite, or just carbon, depending on industry). "Carbon fiber," as used in this disclosure, is a composite material including a polymer reinforced with carbon. In general, carbon fiber composites consist of two parts, a matrix and a reinforcement. In carbon fiber reinforced plastic, the carbon fiber constitutes the reinforcement, which provides strength. The matrix can include a polymer resin, such as epoxy, to bind reinforcements together. Such reinforcement achieves an increase in CFRP's strength and rigidity, measured by stress and elastic modulus, respectively. In embodiments, carbon fibers themselves can each comprise a diameter between 5-10 micrometers and include a high percentage (i.e. above 85%) of carbon atoms. A person of ordinary skill in the art will appreciate that the advantages of carbon fibers include high stiffness, high tensile strength, low weight, high chemical resistance, high temperature tolerance, and low thermal expansion. According to embodiments, carbon fibers may be combined with other materials to form a composite, when permeated with plastic resin and baked, carbon fiber reinforced polymer becomes extremely rigid. Rigidity may be considered analogous to stiffness which may be measured using Young's Modulus. Rigidity may be defined as a force necessary to bend and/or flex a material and/or structure to a given degree. For example, ceramics have high rigidity, which can be visualized by shattering before bending. In embodiments, carbon fibers may additionally, or alternatively, be composited with other materials like graphite to form reinforced carbon-carbon composites, which include high heat tolerances over 2000° C. A person of skill in the art will further appreciate that aerospace applications may require high-strength, low-weight, high heat resistance materials in a plurality of roles, such as without limitation fuselages, fairings, control surfaces, and structures, among others.

With continued reference to FIG. 4, BWB 404 may include at least a fuselage. A "fuselage," for the purposes of this disclosure, refers to a main body of an aircraft 400, or in other words, an entirety of the aircraft 400 except for nose, wings, empennage, nacelles, and control surfaces. In some cases, fuselage may contain an aircraft's payload. At least a fuselage may comprise structural components that physically support a shape and structure of an aircraft 400. Structural components may take a plurality of forms, alone or in combination with other types. Structural components vary depending on construction type of aircraft 400 and specifically, fuselage. A fuselage 412 may include a truss structure. A truss structure may be used with a lightweight aircraft. A truss structure may include welded steel tube trusses. A "truss," as used in this disclosure, is an assembly of beams that create a rigid structure, for example without limitation including combinations of triangles to create three-dimensional shapes. A truss structure may include wood construction in place of steel tubes, or a combination thereof. In some embodiments, structural components can comprise steel tubes and/or wood beams. An aircraft skin may be layered over a body shape constructed by trusses. Aircraft skin may comprise a plurality of materials such as plywood sheets, aluminum, fiberglass, and/or carbon fiber.

With continued reference to FIG. 4, in embodiments, at least a fuselage may comprise geodesic construction. Geodesic structural elements may include stringers wound about formers (which may be alternatively called station frames) in opposing spiral directions. A "stringer," for the purposes of this disclosure is a general structural element that includes a long, thin, and rigid strip of metal or wood that is mechanically coupled to and spans the distance from, station frame to station frame to create an internal skeleton on which to mechanically couple aircraft skin. A former (or station frame) can include a rigid structural element that is disposed along a length of an interior of a fuselage orthogonal to a longitudinal (nose to tail) axis of aircraft 400. In some cases, a former forms a general shape of at least a fuselage. A former may include differing cross-sectional shapes at differing locations along a fuselage, as the former is a structural component that informs an overall shape of the fuselage. In embodiments, aircraft skin can be anchored to formers and strings such that an outer mold line of volume encapsulated by the formers and stringers comprises a same shape as aircraft 400 when installed. In other words, former(s) may form a fuselage's ribs, and stringers may form interstitials between the ribs. A spiral orientation of stringers about formers may provide uniform robustness at any point on an aircraft fuselage such that if a portion sustains damage, another portion may remain largely unaffected. Aircraft skin may be mechanically coupled to underlying stringers and formers and may interact with a fluid, such as air, to generate lift and perform maneuvers.

With continued reference to FIG. 4, according to some embodiments, a fuselage can comprise monocoque construction. Monocoque construction can include a primary structure that forms a shell (or skin in an aircraft's case) and supports physical loads. Monocoque fuselages are fuselages in which the aircraft skin or shell may also include a primary structure. In monocoque construction aircraft skin would support tensile and compressive loads within itself and true monocoque aircraft can be further characterized by an absence of internal structural elements. Aircraft skin in this construction method may be rigid and can sustain its shape with substantially no structural assistance form underlying skeleton-like elements. Monocoque fuselage may include aircraft skin made from plywood layered in varying grain directions, epoxy-impregnated fiberglass, carbon fiber, or any combination thereof.

With continued reference to FIG. 4, according to some embodiments, a fuselage may include a semi-monocoque construction. Semi-monocoque construction, as used in this disclosure, is used interchangeably with partially monocoque construction, discussed above. In semi-monocoque construction, a fuselage may derive some structural support from stressed aircraft skin and some structural support from underlying frame structure made of structural components. Formers or station frames can be seen running transverse to a long axis of fuselage with circular cutouts which may be used in real-world manufacturing for weight savings and for routing of electrical harnesses and other modern on-board systems. In a semi-monocoque construction, stringers may be thin, long strips of material that run parallel to a fuselage's long axis. Stringers can be mechanically coupled to formers permanently, such as with rivets. Aircraft skin can be mechanically coupled to stringers and formers permanently, such as by rivets as well. A person of ordinary skill in the art will appreciate that there are numerous methods for mechanical fastening of the aforementioned components like screws, nails, dowels, pins, anchors, adhesives like glue or epoxy, or bolts and nuts, to name a few. According to some embodiments, a subset of semi-monocoque construction may be unibody construction. Unibody, which is short for "unitized body" or alternatively "unitary construction," vehicles are characterized by a construction in which body, floor plan, and chassis form a single structure, for example an automobile. In the aircraft world, a unibody may include internal structural elements, like formers and stringers, constructed in one piece, integral to an aircraft skin. In some cases, stringers and formers may account for a bulk of any aircraft structure (excluding monocoque construction). Stringers and formers can be arranged in a plurality of orientations depending on aircraft operation and materials. Stringers may be arranged to carry axial (tensile or compressive), shear, bending or torsion forces throughout their overall structure. Due to their coupling to aircraft skin, aerodynamic forces exerted on aircraft skin may be transferred to stringers. Location of said stringers greatly informs type of forces and loads applied to each and every stringer, all of which may be accounted for through design processes including, material selection, cross-sectional area, and mechanical coupling methods of each member. Similar methods may be performed for former assessment and design. In general, formers may be significantly larger in cross-sectional area and thickness, depending on location, than stringers. Both stringers and formers may comprise aluminum, aluminum alloys, graphite epoxy composite, steel alloys, titanium, or an undisclosed material alone or in combination.

With continued reference to FIG. 4, stressed skin, when used in semi-monocoque construction, may bear partial, yet significant, load. In other words, an internal structure, whether it be a frame of welded tubes, formers and stringers, or some combination, is not sufficiently strong enough by design to bear all loads. The concept of stressed skin is applied in monocoque and semi-monocoque construction methods of at least a fuselage and/or BWB 404. In some cases, monocoque may be considered to include substantially only structural skin, and in that sense, aircraft skin undergoes stress by applied aerodynamic fluids imparted by fluid. Stress as used in continuum mechanics can be described in pound-force per square inch ($lbf/in^2$) or Pascals (Pa). In semi-monocoque construction stressed skin bears part of aerodynamic loads and additionally imparts force on an underlying structure of stringers and formers.

With continued reference to FIG. 4, a fuselage may include an interior cavity. An interior cavity may include a volumetric space configurable to house passenger seats and/or cargo. An interior cavity may be configured to include receptacles for fuel tanks, batteries, fuel cells, or other energy sources as described herein. In some cases, a post may be supporting a floor (i.e., deck), or in other words a surface on which a passenger, operator, passenger, payload, or other object would rest on due to gravity when within an aircraft 400 is in its level flight orientation or sitting on ground. A post may act similarly to stringer in that it is configured to support axial loads in compression due to a load being applied parallel to its axis due to, for example, a heavy object being placed on a floor of aircraft 400. A beam may be disposed in or on any portion a fuselage that requires additional bracing, specifically when disposed transverse to another structural element, like a post, which would benefit from support in that direction, opposing applied force. A beam may be disposed in a plurality of locations and orientations within a fuselage as necessitated by operational and constructional requirements.

With continued reference to FIG. 4, aircraft 400 may include at least a flight component 408. A flight component 408 may be consistent with any description of a flight component described in this disclosure, such as without limitation propulsors, control surfaces, rotors, paddle wheels, engines, propellers, wings, winglets, or the like. For the purposes of this disclosure, at least a "flight component" is at least one element of an aircraft 400 configured to manipulate a fluid medium such as air to propel, control, or maneuver an aircraft. In nonlimiting examples, at least a flight component may include a rotor mechanically connected to a rotor shaft of an electric motor further mechanically affixed to at least a portion of aircraft 400. In some embodiments, at least a flight component 408 may include a propulsor, for example a rotor attached to an electric motor configured to produce shaft torque and in turn, create thrust. As used in this disclosure, an "electric motor" is an electrical machine that converts electric energy into mechanical work.

With continued reference to FIG. 4, for the purposes of this disclosure, "torque", is a twisting force that tends to cause rotation. Torque may be considered an effort and a rotational analogue to linear force. A magnitude of torque of a rigid body may depend on three quantities: a force applied, a lever arm vector connecting a point about which the torque is being measured to a point of force application, and an angle between the force and the lever arm vector. A force applied perpendicularly to a lever multiplied by its distance from the lever's fulcrum (the length of the lever arm) is its torque. A force of three newtons applied two meters from the fulcrum, for example, exerts the same torque as a force of one newton applied six meters from the fulcrum. In some cases, direction of a torque can be determined by using a right-hand grip rule which states: if fingers of right hand are curled from a direction of lever arm to direction of force, then thumb points in a direction of the torque. One of ordinary skill in the art would appreciate that torque may be represented as a vector, consistent with this disclosure, and therefore may include a magnitude and a direction. "Torque" and "moment" are used interchangeably within this disclosure. Any torque command or signal within this disclosure may include at least the steady state torque to achieve the torque output to at least a propulsor.

With continued reference to FIG. 4, at least a flight component may be one or more devices configured to affect aircraft's 400 attitude. "Attitude," for the purposes of this disclosure, is the relative orientation of a body, in this case aircraft 400, as compared to earth's surface or any other reference point and/or coordinate system. In some cases, attitude may be displayed to pilots, personnel, remote users, or one or more computing devices in an attitude indicator, such as without limitation a visual representation of a horizon and its relative orientation to aircraft 400. A plurality of attitude datums may indicate one or more measurements relative to an aircraft's pitch, roll, yaw, or throttle compared to a relative starting point. One or more sensors may measure or detect an aircraft's 400 attitude and establish one or more attitude datums. An "attitude datum," for the purposes of this disclosure, refers to at least an element of data identifying an attitude of an aircraft 400.

With continued reference to FIG. 4, in some cases, aircraft 400 may include at least a pilot control. As used in this disclosure, a "pilot control," is an interface device that allows an operator, human or machine, to control a flight component of an aircraft. Pilot control may be communicatively connected to any other component presented in aircraft 400, the communicative connection may include redundant connections configured to safeguard against single-point failure. In some cases, a plurality of attitude datums may indicate a pilot's instruction to change heading and/or trim of an aircraft 400. Pilot input may indicate a pilot's instruction to change an aircraft's pitch, roll, yaw, throttle, and/or any combination thereof. Aircraft trajectory may be manipulated by one or more control surfaces and propulsors working alone or in tandem consistent with the entirety of this disclosure. "Pitch," for the purposes of this disclosure refers to an aircraft's angle of attack, which is a difference between a plane including at least a portion of both wings of the aircraft running nose to tail and a horizontal flight trajectory. For example, an aircraft may pitch "up" when its nose is angled upward compared to horizontal flight, as in a climb maneuver. In another example, an aircraft may pitch "down," when its nose is angled downward compared to horizontal flight, like in a dive maneuver. In some cases, angle of attack may not be used as an input, for instance pilot input, to any system disclosed herein; in such circumstances proxies may be used such as pilot controls, remote controls, or sensor levels, such as true airspeed sensors, pitot tubes, pneumatic/hydraulic sensors, and the like. "Roll" for the purposes of this disclosure, refers to an aircraft's position about its longitudinal axis, which is to say that when an aircraft rotates about its axis from its tail to its nose, and one side rolls upward, as in a banking maneuver. "Yaw," for the purposes of this disclosure, refers to an aircraft's turn angle, when an aircraft rotates about an imaginary vertical axis intersecting center of earth and aircraft 400. "Throttle," for the purposes of this disclosure, refers to an aircraft outputting an amount of thrust from a propulsor. In context of a pilot input, throttle may refer to a pilot's input to increase or decrease thrust produced by at least a propulsor. Flight components 408 may receive and/or transmit signals, for example an aircraft command signal. Aircraft command signal may include any signal described in this disclosure, such as without limitation electrical signal, optical signal, pneumatic signal, hydraulic signal, and/or mechanical signal. In some cases, an aircraft command may be a function of a signal from a pilot control. In some cases, an aircraft command may include or be determined as a function of a pilot command. For example, aircraft commands may be determined as a function of a mechanical movement of a throttle. Signals may include analog signals, digital signals, periodic or aperiodic signal, step signals, unit impulse signal, unit ramp signal, unit parabolic signal, signum function, exponential signal, rectangular signal, triangular signal, sinusoidal signal, sinc function, or pulse width modulated signal. Pilot control may include circuitry, computing devices, electronic components or a combination thereof that translates pilot input into a signal configured to be transmitted to another electronic component. In some cases, a plurality of attitude commands may be determined as a function of an input to a pilot control. A plurality of attitude commands may include a total attitude command datum, such as a combination of attitude adjustments represented by one or a certain number of combinatorial datums. A plurality of attitude commands may include individual attitude datums representing total or relative change in attitude measurements relative to pitch, roll, yaw, and throttle.

With continued reference to FIG. 4, in some embodiments, pilot control may include at least a sensor. As used in this disclosure, a "sensor" is a device that detects a phenomenon. In some cases, a sensor may detect a phenomenon and transmit a signal that is representative of the phenomenon. At least a sensor may include, torque sensor, gyroscope, accelerometer, magnetometer, inertial measurement unit (IMU), pressure sensor, force sensor, proximity sensor, displacement sensor, vibration sensor, among others. At least a sensor may include a sensor suite which may include a plurality of sensors that may detect similar or unique phenomena. For example, in a non-limiting embodiment, sensor suite may include a plurality of accelerometers, a mixture of accelerometers and gyroscopes, or a mixture of an accelerometer, gyroscope, and torque sensor. For the purposes of the disclosure, a "torque datum" is one or more elements of data representing one or more parameters detailing power output by one or more propulsors, flight components, or other elements of an electric aircraft. A torque datum may indicate the torque output of at least a flight component 408. At least a flight component 408 may include any propulsor as described herein. In embodiment, at least a flight component 408 may include an electric motor, a propeller, a jet engine, a paddle wheel, a rotor, turbine, or any other mechanism configured to manipulate a fluid medium to propel an aircraft as described herein. an embodiment of at least a sensor may include or be included in, a sensor suite. The herein disclosed system and method may comprise a plurality of sensors in the form of individual sensors or a sensor suite working in tandem or individually. A sensor suite may include a plurality of independent sensors, as described herein, where any number of the described sensors may be used to detect any number of physical or electrical quantities associated with an aircraft power system or an electrical energy storage system. Independent sensors may include separate sensors measuring physical or electrical quantities that may be powered by and/or in communication with circuits independently, where each may signal sensor output to a control circuit such as a user graphical interface. In a non-limiting example, there may be four independent sensors housed in and/or on battery pack measuring temperature, electrical characteristic such as voltage, amperage, resistance, or impedance, or any other parameters and/or quantities as described in this disclosure. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability of a battery management system and/or user to detect phenomenon is maintained and in a non-limiting example, a user alter aircraft usage pursuant to sensor readings.

With continued reference to FIG. 4, at least a sensor may include a moisture sensor. "Moisture," as used in this disclosure, is the presence of water, this may include vaporized water in air, condensation on the surfaces of objects, or concentrations of liquid water. Moisture may include humidity. "Humidity," as used in this disclosure, is the property of a gaseous medium (almost always air) to hold water in the form of vapor. An amount of water vapor contained within a parcel of air can vary significantly. Water vapor is generally invisible to the human eye and may be damaging to electrical components. There are three primary measurements of humidity, absolute, relative, specific humidity. "Absolute humidity," for the purposes of this disclosure, describes the water content of air and is expressed in either grams per cubic meters or grams per kilogram. "Relative humidity," for the purposes of this disclosure, is expressed as a percentage, indicating a present stat of absolute humidity relative to a maximum humidity given the same temperature. "Specific humidity," for the purposes of this disclosure, is the ratio of water vapor mass to total moist air parcel mass, where parcel is a given portion of a gaseous medium. A moisture sensor may be psychrometer. A moisture sensor may be a hygrometer. A moisture sensor may be configured to act as or include a humidistat. A "humidistat," for the purposes of this disclosure, is a humidity-triggered switch, often used to control another electronic device. A moisture sensor may use capacitance to measure relative humidity and include in itself, or as an external component, include a device to convert relative humidity measurements to absolute humidity measurements. "Capacitance," for the purposes of this disclosure, is the ability of a system to store an electric charge, in this case the system is a parcel of air which may be near, adjacent to, or above a battery cell.

With continued reference to FIG. 4, at least a sensor may include electrical sensors. An electrical sensor may be configured to measure voltage across a component, electrical current through a component, and resistance of a component. Electrical sensors may include separate sensors to measure each of the previously disclosed electrical characteristics such as voltmeter, ammeter, and ohmmeter, respectively. One or more sensors may be communicatively coupled to at least a pilot control, the manipulation of which, may constitute at least an aircraft command. Signals may include electrical, electromagnetic, visual, audio, radio waves, or another undisclosed signal type alone or in combination. At least a sensor communicatively connected to at least a pilot control may include a sensor disposed on, near, around or within at least pilot control. At least a sensor may include a motion sensor. "Motion sensor," for the purposes of this disclosure refers to a device or component configured to detect physical movement of an object or grouping of objects. One of ordinary skill in the art would appreciate, after reviewing the entirety of this disclosure, that motion may include a plurality of types including but not limited to: spinning, rotating, oscillating, gyrating, jumping, sliding, reciprocating, or the like. At least a sensor may include, torque sensor, gyroscope, accelerometer, torque sensor, magnetometer, inertial measurement unit (IMU), pressure sensor, force sensor, proximity sensor, displacement sensor, vibration sensor, among others. At least a sensor may include a sensor suite which may include a plurality of sensors that may detect similar or unique phenomena. For example, in a non-limiting embodiment, sensor suite may include a plurality of accelerometers, a mixture of accelerometers and gyroscopes, or a mixture of an accelerometer, gyroscope, and torque sensor. The herein disclosed system and method may comprise a plurality of sensors in the form of individual sensors or a sensor suite working in tandem or individually. A sensor suite may include a plurality of independent sensors, as described herein, where any number of the described sensors may be used to detect any number of physical or electrical quantities associated with an aircraft power system or an electrical energy storage system. Independent sensors may include separate sensors measuring physical or electrical quantities that may be powered by and/or in communication with circuits independently, where each may signal sensor output to a control circuit such as a user graphical interface. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability to detect phenomenon is maintained and in a non-limiting example, a user alter aircraft usage pursuant to sensor readings.

With continued reference to FIG. 4, at least a flight component 408 may include wings, empennages, nacelles, control surfaces, fuselages, and landing gear, among others, to name a few. In embodiments, an empennage may be disposed at the aftmost point of an aircraft body 404. Empennage may comprise a tail of aircraft 400, further comprising rudders, vertical stabilizers, horizontal stabilizers, stabilators, elevators, trim tabs, among others. At least a portion of empennage may be manipulated directly or indirectly by pilot commands to impart control forces on a fluid in which the aircraft 400 is flying. Manipulation of these empennage control surfaces may, in part, change an aircraft's heading in pitch, roll, and yaw. Wings comprise may include structures which include airfoils configured to create a pressure differential resulting in lift. Wings are generally disposed on a left and right side of aircraft 400 symmetrically, at a point between nose and empennage. Wings may comprise a plurality of geometries in planform view, swept swing, tapered, variable wing, triangular, oblong, elliptical, square, among others. Wings may be blended into the body of the aircraft such as in a BWB 404 aircraft 400 where no strong delineation of body and wing exists. A wing's cross section geometry may comprise an airfoil. An "airfoil" as used in this disclosure, is a shape specifically designed such that a fluid flowing on opposing sides of it exert differing levels of pressure against the airfoil. In embodiments, a bottom surface of an aircraft can be configured to generate a greater pressure than does a top surface, resulting in lift. A wing may comprise differing and/or similar cross-sectional geometries over its cord length, e.g. length from wing tip to where wing meets the aircraft's body. One or more wings may be symmetrical about an aircraft's longitudinal plane, which comprises a longitudinal or roll axis reaching down a center of the aircraft through the nose and empennage, and the aircraft's yaw axis. In some cases, wings may comprise controls surfaces configured to be commanded by a pilot and/or autopilot to change a wing's geometry and therefore its interaction with a fluid medium. Flight component 408 may include control surfaces. Control surfaces may include without limitation flaps, ailerons, tabs, spoilers, and slats, among others. In some cases, control surfaces may be disposed on wings in a plurality of locations and arrangements. In some cases, control surfaces may be disposed at leading and/or trailing edges of wings, and may be configured to deflect up, down, forward, aft, or any combination thereof.

In some cases, flight component 408 may include a winglet or wingtip device. Wingtip devices may be used to improve efficiency of fixed-wing aircraft by reducing drag. Although there are several types of wingtip devices which function in different manners, their intended effect may be to reduce an aircraft's drag by partial recovery of tip vortex energy. Wingtip devices can also improve aircraft handling characteristics and enhance safety for aircraft 400. Such devices increase an effective aspect ratio of a wing without greatly increasing wingspan. Extending wingspan may lower lift-induced drag but would increase parasitic drag and would require boosting the strength and weight of the wing. As a result according to some aeronautic design equations, a maximum wingspan made be determined above which no net benefit exits from further increased span. There may also be operational considerations that limit the allowable wingspan (e.g., available width at airport gates).

Wingtip devices, in some cases, may increase lift generated at wingtip (by smoothing airflow across an upper wing near the wingtip) and reduce lift-induced drag caused by wingtip vortices, thereby improving a lift-to-drag ratio. This increases fuel efficiency in powered aircraft and increases cross-country speed in gliders, in both cases increasing range. U.S. Air Force studies indicate that a given improvement in fuel efficiency correlates directly and causally with increase in an aircraft's lift-to-drag ratio. The term "winglet" has previously been used to describe an additional lifting surface on an aircraft, like a short section between wheels on fixed undercarriage. An upward angle (i.e., cant) of a winglet, its inward or outward angle (i.e., toe), as well as its size and shape are selectable design parameters which may be chosen for correct performance in a given application. A wingtip vortex, which rotates around from below a wing, strikes a cambered surface of a winglet, generating a force that angles inward and slightly forward. A winglet's relation to a wingtip vortex may be considered analogous to sailboat sails when sailing to windward (i.e., close-hauled). Similar to the close-hauled sailboat's sails, winglets may convert some of what would otherwise-be wasted energy in a wingtip vortex to an apparent thrust. This small contribution can be worthwhile over the aircraft's lifetime. Another potential benefit of winglets is that they may reduce an intensity of wake vortices. Wake vortices may trail behind an aircraft 400 and pose a hazard to other aircraft. Minimum spacing requirements between aircraft at airports are largely dictated by hazards, like those from wake vortices. Aircraft are classified by weight (e.g., "Light," "Heavy," and the like) often base upon vortex strength, which grows with an aircraft's lift coefficient. Thus, associated turbulence is greatest at low speed and high weight, which may be produced at high angle of attack near airports. Winglets and wingtip fences may also increase efficiency by reducing vortex interference with laminar airflow near wingtips, by moving a confluence of low-pressure air (over wing) and high-pressure air (under wing) away from a surface of the wing. Wingtip vortices create turbulence, which may originate at a leading edge of a wingtip and propagate backwards and inboard. This turbulence may delaminate airflow over a small triangular section of an outboard wing, thereby frustrating lift in that area. A fence/winglet drives an area where a vortex forms upward away from a wing surface, as the resulting vortex is repositioned to a top tip of the winglet.

With continued reference to FIG. 4, aircraft 400 may include an energy source. Energy source may include any device providing energy to at least a flight component 408, for example at least a propulsors. Energy source may include, without limitation, a generator, a photovoltaic device, a fuel cell such as a hydrogen fuel cell, direct methanol fuel cell, and/or solid oxide fuel cell, or an electric energy storage device; electric energy storage device may include without limitation a battery, a capacitor, and/or inductor. The energy source and/or energy storage device may include at least a battery, battery cell, and/or a plurality of battery cells connected in series, in parallel, or in a combination of series and parallel connections such as series connections into modules that are connected in parallel with other like modules. Battery and/or battery cell may include, without limitation, Li ion batteries which may include NCA, NMC, Lithium iron phosphate (LiFePO4) and Lithium Manganese Oxide (LMO) batteries, which may be mixed with another cathode chemistry to provide more specific power if the application requires Li metal batteries, which have a lithium metal anode that provides high power on demand, Li ion batteries that have a silicon or titanite anode. In embodiments, the energy source may be used to provide electrical power to an electric or hybrid propulsor during moments requiring high rates of power output, including without limitation takeoff, landing, thermal de-icing and situations requiring greater power output for reasons of stability, such as high turbulence situations. In some cases, battery may include, without limitation a battery using nickel based chemistries such as nickel cadmium or nickel metal hydride, a battery using lithium ion battery chemistries such as a nickel cobalt aluminum (NCA), nickel manganese cobalt (NMC), lithium iron phosphate (LiFePO4), lithium cobalt oxide (LCO), and/or lithium manganese oxide (LMO), a battery using lithium polymer technology, lead-based batteries such as without limitation lead acid batteries, metal-air batteries, or any other suitable battery. A person of ordinary skill in the art, upon reviewing the entirety of this disclosure, will be aware of various devices of components that may be used as an energy source.

With continued reference to FIG. 4, in further nonlimiting embodiments, an energy source may include a fuel store. As used in this disclosure, a "fuel store" is an aircraft component configured to store a fuel. In some cases, a fuel store may include a fuel tank. Fuel may include a liquid fuel, a gaseous fluid, a solid fuel, and fluid fuel, a plasma fuel, and the like. As used in this disclosure, a "fuel" may include any substance that stores energy. Exemplary non-limiting fuels include hydrocarbon fuels, petroleum-based fuels, synthetic fuels, chemical fuels, Jet fuels (e.g., Jet-A fuel, Jet-B fuel, and the like), kerosene-based fuel, gasoline-based fuel, an electrochemical-based fuel (e.g., lithium-ion battery), a hydrogen-based fuel, natural gas-based fuel, and the like. As described in greater detail below fuel store may be located substantially within blended wing body 404 of aircraft 400, for example without limitation within a wing portion 412 of blended wing body 408. Aviation fuels may include petroleum-based fuels, or petroleum and synthetic fuel blends, used to power aircraft 400. In some cases, aviation fuels may have more stringent requirements than fuels used for ground use, such as heating and road transport. Aviation fuels may contain additives to enhance or maintain properties important to fuel performance or handling. Fuel may be kerosene-based (JP-8 and Jet A-1), for example for gas turbine-powered aircraft. Piston-engine aircraft may use gasoline-based fuels and/or kerosene-based fuels (for example for Diesel engines). In some cases, specific energy may be considered an important criterion in selecting fuel for an aircraft 400. Liquid fuel may include Jet-A. Presently Jet-A powers modern commercial airliners and is a mix of extremely refined kerosene and burns at temperatures at or above 49° C. (120° F.). Kerosene-based fuel has a much higher flash point than gasoline-based fuel, meaning that it requires significantly higher temperature to ignite.

With continued reference to FIG. 4, modular aircraft 400 may include an energy source which may include a fuel cell. As used in this disclosure, a "fuel cell" is an electrochemical device that combines a fuel and an oxidizing agent to create electricity. In some cases, fuel cells are different from most batteries in requiring a continuous source of fuel and oxygen (usually from air) to sustain the chemical reaction, whereas in a battery the chemical energy comes from metals and their ions or oxides that are commonly already present in the battery, except in flow batteries. Fuel cells can produce electricity continuously for as long as fuel and oxygen are supplied.

With continued reference to FIG. 4, in some embodiments, fuel cells may consist of different types. Commonly a fuel cell consists of an anode, a cathode, and an electrolyte that allows ions, often positively charged hydrogen ions (protons), to move between two sides of the fuel cell. At anode, a catalyst causes fuel to undergo oxidation reactions that generate ions (often positively charged hydrogen ions) and electrons. Ions move from anode to cathode through electrolyte. Concurrently, electrons may flow from anode to cathode through an external circuit, producing direct current electricity. At cathode, another catalyst causes ions, electrons, and oxygen to react, forming water and possibly other products. Fuel cells may be classified by type of electrolyte used and by difference in startup time ranging from 4 second for proton-exchange membrane fuel cells (PEM fuel cells, or PEMFC) to 10 minutes for solid oxide fuel cells (SOFC). In some cases, energy source may include a related technology, such as flow batteries. Within a flow battery fuel can be regenerated by recharging. Individual fuel cells produce relatively small electrical potentials, about 0.7 volts. Therefore, in some cases, fuel cells may be "stacked", or placed in series, to create sufficient voltage to meet an application's requirements. In addition to electricity, fuel cells may produce water, heat and, depending on the fuel source, very small amounts of nitrogen dioxide and other emissions. Energy efficiency of a fuel cell is generally between 40 and 90%.

Fuel cell may include an electrolyte. In some cases, electrolyte may define a type of fuel cell. Electrolyte may include any number of substances like potassium hydroxide, salt carbonates, and phosphoric acid. Commonly a fuel cell is fueled by hydrogen. Fuel cell may feature an anode catalyst, like fine platinum powder, which breaks down fuel into electrons and ions. Fuel cell may feature a cathode catalyst, often nickel, which converts ions into waste chemicals, with water being the most common type of waste. A fuel cell may include gas diffusion layers that are designed to resist oxidization.

With continued reference to FIG. 4, aircraft 400 may include an energy source which may include a cell such as a battery cell, or a plurality of battery cells making a battery module. An energy source may be a plurality of energy sources. The module may include batteries connected in parallel or in series or a plurality of modules connected either in series or in parallel designed to deliver both the power and energy requirements of the application. Connecting batteries in series may increase the voltage of an energy source which may provide more power on demand. High voltage batteries may require cell matching when high peak load is needed. As more cells are connected in strings, there may exist the possibility of one cell failing which may increase resistance in the module and reduce the overall power output as the voltage of the module may decrease as a result of that failing cell. Connecting batteries in parallel may increase total current capacity by decreasing total resistance, and it also may increase overall amp-hour capacity. The overall energy and power outputs of an energy source may be based on the individual battery cell performance, or an extrapolation based on the measurement of at least an electrical parameter. In an embodiment where an energy source includes a plurality of battery cells, the overall power output capacity may be dependent on the electrical parameters of each individual cell. If one cell experiences high self-discharge during demand, power drawn from an energy source may be decreased to avoid damage to the weakest cell. An energy source may further include, without limitation, wiring, conduit, housing, cooling system and battery management system. Persons skilled in the art will be aware, after reviewing the entirety of this disclosure, of many different components of an energy source.

With continued reference to FIG. 4, aircraft 400 may include multiple flight component 408 sub-systems, each of which may have a separate energy source. For instance, and without limitation, one or more flight components 408 may have a dedicated energy source. Alternatively, or additionally, a plurality of energy sources may each provide power to two or more flight components 408, such as, without limitation, a "fore" energy source providing power to flight components located toward a front of an aircraft 400, while an "aft" energy source provides power to flight components located toward a rear of the aircraft 400. As a further non-limiting example, a flight component of group of flight components may be powered by a plurality of energy sources. For example, and without limitation, two or more energy sources may power one or more flight components; two energy sources may include, without limitation, at least a first energy source having high specific energy density and at least a second energy source having high specific power density, which may be selectively deployed as required for higher-power and lower-power needs. Alternatively, or additionally, a plurality of energy sources may be placed in parallel to provide power to the same single propulsor or plurality of propulsors 408. Alternatively, or additionally, two or more separate propulsion subsystems may be joined using intertie switches (not shown) causing the two or more separate propulsion subsystems to be treatable as a single propulsion subsystem or system, for which potential under load of combined energy sources may be used as the electric potential. Persons skilled in the art, upon reviewing the entirety of this disclosure, will be aware of various combinations of energy sources that may each provide power to single or multiple propulsors in various configurations.

With continued reference to FIG. 4, aircraft 400 may include a flight component 408 that includes at least a nacelle 408. For the purposes of this disclosure, a "nacelle" is a streamlined body housing, which is sized according to that which is houses, such as without limitation an engine, a fuel store, or a flight component. When attached by a pylon entirely outside an airframe 404 a nacelle may sometimes be referred to as a pod, in which case an engine within the nacelle may be referred to as a podded engine. In some cases an aircraft cockpit may also be housed in a nacelle, rather than in a conventional fuselage. At least a nacelle may substantially encapsulate a propulsor, which may include a motor or an engine. At least a nacelle may be mechanically connected to at least a portion of aircraft 400 partially or wholly enveloped by an outer mold line of the aircraft 400. At least a nacelle may be designed to be streamlined. At least a nacelle may be asymmetrical about a plane comprising the longitudinal axis of the engine and the yaw axis of modular aircraft 400.

With continued reference to FIG. 4, a flight component may include a propulsor. A "propulsor," as used herein, is a component or device used to propel a craft by exerting force on a fluid medium, which may include a gaseous medium such as air or a liquid medium such as water. For the purposes of this disclosure, "substantially encapsulate" is the state of a first body (e.g., housing) surrounding all or most of a second body. A motor may include without limitation, any electric motor, where an electric motor is a device that converts electrical energy into mechanical work for instance by causing a shaft to rotate. A motor may be driven by direct current (DC) electric power; for instance, a motor may include a brushed DC motor or the like. A motor may be driven by electric power having varying or reversing voltage levels, such as alternating current (AC) power as produced by an alternating current generator and/or inverter, or otherwise varying power, such as produced by a switching power source. A motor may include, without limitation, a brushless DC electric motor, a permanent magnet synchronous motor, a switched reluctance motor, and/or an induction motor; persons skilled in the art, upon reviewing the entirety of this disclosure, will be aware of various alternative or additional forms and/or configurations that a motor may take or exemplify as consistent with this disclosure. In addition to inverter and/or switching power source, a circuit driving motor may include electronic speed controllers or other components for regulating motor speed, rotation direction, torque, and/or dynamic braking. Motor may include or be connected to one or more sensors detecting one or more conditions of motor; one or more conditions may include, without limitation, voltage levels, electromotive force, current levels, temperature, current speed of rotation, position sensors, and the like. For instance, and without limitation, one or more sensors may be used to detect back-EMF, or to detect parameters used to determine back-EMF, as described in further detail below. One or more sensors may include a plurality of current sensors, voltage sensors, and speed or position feedback sensors. One or more sensors may communicate a current status of motor to a flight controller and/or a computing device; computing device may include any computing device as described in this disclosure, including without limitation, a flight controller.

With continued reference to FIG. 4, a motor may be connected to a thrust element. Thrust element may include any device or component that converts mechanical work, for example of a motor or engine, into thrust in a fluid medium. Thrust element may include, without limitation, a device using moving or rotating foils, including without limitation one or more rotors, an airscrew or propeller, a set of airscrews or propellers such as contra-rotating propellers or co-rotating propellers, a moving or flapping wing, or the like. Thrust element may include without limitation a marine propeller or screw, an impeller, a turbine, a pump-jet, a paddle or paddle-based device, or the like. Thrust element may include a rotor. Persons skilled in the art, upon reviewing the entirety of this disclosure, will be aware of various devices that may be used as thrust element. A thrust element may include any device or component that converts mechanical energy (i.e., work) of a motor, for instance in form of rotational motion of a shaft, into thrust within a fluid medium. As another non-limiting example, a thrust element may include an eight-bladed pusher propeller, such as an eight-bladed propeller mounted behind the engine to ensure the drive shaft is in compression.

With continued reference to FIG. 4, in nonlimiting embodiments, at least a flight component 408 may include an airbreathing engine such as a jet engine, turbojet engine, turboshaft engine, ramjet engine, scramjet engine, hybrid propulsion system, turbofan engine, or the like. At least a flight component 408 may be fueled by any fuel described in this disclosure, for instance without limitation Jet-A, Jet-B, diesel fuel, gasoline, or the like. In nonlimiting embodiments, a jet engine is a type of reaction engine discharging a fast-moving jet that generates thrust by jet propulsion. As used in this disclosure, a "jet" is a stream of fluid that is projected into a surrounding medium from an aperture (e.g., nozzle). While this broad definition can include rocket, water jet, and hybrid propulsion, the term jet engine, in some cases, refers to an internal combustion airbreathing jet engine such as a turbojet, turbofan, ramjet, or pulse jet. In general, jet engines are internal combustion engines. As used in this disclosure, a "combustion engine" is a mechanical device that is configured to convert mechanical work from heat produced by combustion of a fuel. In some cases, a combustion engine may operate according to an approximation of a thermodynamic cycle, such as without limitation a Carnot cycle, a Cheng cycle, a Combined cycle, a Brayton cycle, an Otto cycle, an Allam power cycle, a Kalina cycle, a Rankine cycle, and/or the like. In some cases, a combustion engine may include an internal combustion engine. An internal combustion engine may include a heat engine in which combustion of fuel occurs with an oxidizer (usually air) in a combustion chamber that comprises a part of a working fluid flow circuit. Exemplary internal combustion engines may without limitation a reciprocating engine (e.g., 4-stroke engine), a combustion turbine engine (e.g., jet engines, gas turbines, Brayton cycle engines, and the like), a rotary engine (e.g., Wankel engines), and the like. In nonlimiting embodiments, airbreathing jet engines feature a rotating air compressor powered by a turbine, with leftover power providing thrust through a propelling nozzle—this process may be known as a Brayton thermodynamic cycle. Jet aircraft may use such engines for long-distance travel. Early jet aircraft used turbojet engines that were relatively inefficient for subsonic flight. Most modern subsonic jet aircraft use more complex high-bypass turbofan engines. In some cases, they give higher speed and greater fuel efficiency than piston and propeller aeroengines over long distances. A few air-breathing engines made for highspeed applications (ramjets and scramjets) may use a ram effect of aircraft's speed instead of a mechanical compressor. An airbreathing jet engine (or ducted jet engine) may emit a jet of hot exhaust gases formed from air that is forced into the engine by several stages of centrifugal, axial or ram compression, which is then heated and expanded through a nozzle. In some cases, a majority of mass flow through an airbreathing jet engine may be provided by air taken from outside of the engine and heated internally, using energy stored in the form of fuel. In some cases, a jet engine may include are turbofans. Alternatively and/or additionally, jet engine may include a turbojets. In some cases, a turbofan may use a gas turbine engine core with high overall pressure ratio (e.g., 40:1) and high turbine entry temperature (e.g., about 1800 K) and provide thrust with a turbine-powered fan stage. In some cases, thrust may also be at least partially provided by way of pure exhaust thrust (as in a turbojet engine). In some cases, a turbofan may have a high efficiency, relative to a turbojet. In some cases, a jet engine may use simple ram effect (e.g., ramjet) or pulse combustion (e.g., pulsejet) to give compression. Persons skilled in the art, upon reviewing the entirety of this disclosure, will be aware of various devices that may be used as a thrust element.

With continued reference to FIG. 4, an aircraft 400 may include a flight controller. As used in this disclosure, a "flight controller" is a device that generates signals for controlling at least a flight component 408 of an aircraft 400. In some cases, a flight controller includes electronic circuitry, such as without limitation a digital signal processor (DSP), an application-specific integrated circuit (ASIC), and/or a computing device. Flight controller may use sensor feedback to calculate performance parameters of motor, including without limitation a torque versus speed operation envelope. Persons skilled in the art, upon reviewing the entirety of this disclosure, will be aware of various devices and/or components that may be used as or included in a motor or a circuit operating a motor, as used and described in this disclosure.

With continued reference to FIG. 4, computing device may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Computing device may include a single computing device operating independently, or may include two or more computing device operating in concert, in parallel, sequentially or the like; two or more computing devices may be included together in a single computing device or in two or more computing devices. Computing device may interface or communicate with one or more additional devices as described below in further detail via a network interface device. Network interface device may be utilized for connecting computing device to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device may include but is not limited to, for example, a computing device or cluster of computing devices in a first location and a second computing device or cluster of computing devices in a second location. Computing device may include one or more computing devices dedicated to data storage, security, distribution of traffic for load balancing, and the like. Computing device may distribute one or more computing tasks as described below across a plurality of computing devices of computing device, which may operate in parallel, in series, redundantly, or in any other manner used for distribution of tasks or memory between computing devices. Computing device may be implemented using a "shared nothing" architecture in which data is cached at the worker, in an embodiment, this may enable scalability of system 400 and/or computing device.

With continued reference to FIG. 4, computing device may be designed and/or configured to perform any method, method step, or sequence of method steps in any embodiment described in this disclosure, in any order and with any degree of repetition. For instance, computing device may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 4, in some embodiments, winglet rudder (i.e., control surface) may be used to provide a number of aircraft effects (e.g., pitch, roll, yaw, lateral, bending moment adjustment, braking, and/or drag adjustment), see table above. In some embodiments, winglet rudders be configured to primarily perform one or more of generating yaw moment, producing side forces, increasing induced drag, and decreasing wing bending moment. In some cases, non-primary effects induced by winglet rudders may be compensated by one or more other control surfaces (e.g., ailerons on wings, elevators at tail of aircraft, and/or control surfaces generally on trailing edge of aircraft). In some cases, rudder deflection to provide yaw moment (both rudders moving to the right or both to the left) may result in a rolling moment in opposite direction. This rolling moment can be countered with modest deflection of outboard ailerons or by greater deflection of inboard ailerons (that have less moment arm and are less effective). In some cases, direction of aileron deflection may be opposite to winglet rudder deflection (e.g., right rudder right [outboard/lift inducing] deflection is countered by right aileron upward [inboard/lift reducing] deflection). Compensatory flight control of control surfaces may be performed in any number of ways, for example by flight controller. In some cases, control surface (e.g., aileron) deflection may be pre-mixed with winglet rudder deflection, so that a yaw command from pilot or flight control system provides both winglet rudder and aileron deflection. In some cases, flight controller may deflect only winglet rudders. Then a resulting roll response may be sensed (by one or more sensors connected to flight controller); flight controller may automatically control additional control surfaces to maintain a commanded roll rate or roll acceleration. In some cases, flight controller may "pre-mix" control surface deflections and sense and provide feedback control. For example, an initial command may result in both winglet rudder and aileron deflection, while then adjusting aileron to achieve a commanded roll rate or roll acceleration.

Still referring to FIG. 4, in some embodiments, rudder deflection to provide increased induced drag (e.g., both rudders moved inboard) results in a pitch up effect. Induced drag may be increased because optimal lift distribution provided by no rudder deflection is distorted. Lift may be diminished on outboard wing and winglet, effectively reducing wingspan and increasing induced drag. Pitch-up can be countered by deflecting pitch control surfaces. In some embodiments, pitch control surfaces for an aft-tailed tube-and-wing airplane are elevators, for example on horizontal stabilizer. In some embodiments, on a blended wing body aircraft, center body trailing edge control surfaces (i.e., main body control surfaces) may be effective pitch control surfaces. Alternatively or additionally, ailerons (i.e., wing control surfaces) may also be used. In some cases, on a blended wing body aircraft, use of center body trailing edge surfaces to provide pitch control may be favorable, as deflection of these surfaces have relatively little effect on induced drag. In contrast, nose-down pitch input on outboard ailerons may tends to increase lift of outboard portion of wing; this offsets the reduced lift effect from the winglets, reducing the winglets' effect on increasing induced drag.

Still referring to FIG. 4, in some embodiments, moving winglet rudders inboard may tend to reduce wing bending moment. However, in some cases, this may also result in an unfavorable pitch up effect. Unfavorable pitch up effect may be countered, as described above.

Figure 5:
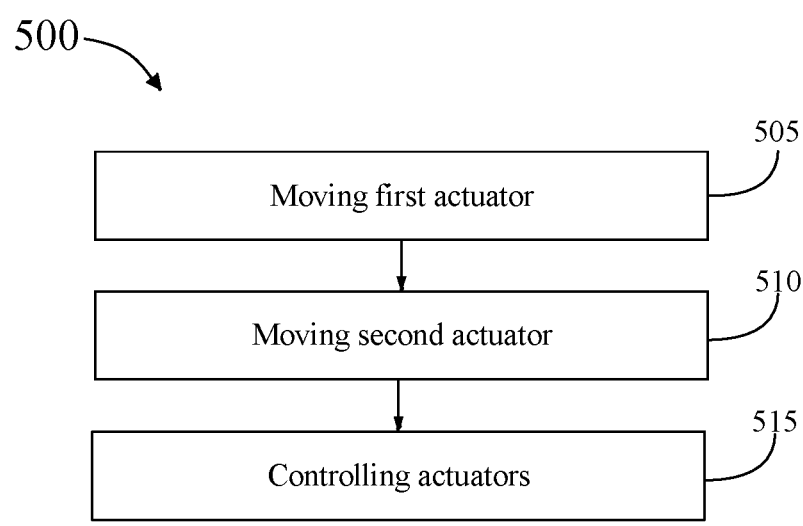
FIG. 5 is flow diagram of an exemplary method of use of an aircraft for aerodynamic control with winglet surfaces.

Referring to FIG. 5, an exemplary method 500 of using an aircraft is illustrated with a flow diagram. Aircraft may include any aircraft described in this disclosure, including with reference to FIGS. 1-4. In some cases, aircraft may have at least a propulsor configured to generate thrust. Propulsor may include any propulsor described in this disclosure, for example with reference to FIGS. 1-4 above. In some cases, aircraft may include a first wing having a first winglet at a distal end of the wing, wherein the first winglet includes at least a first control surface at a first trailing edge of the first winglet. In some cases, aircraft may include a second wing having a second winglet at a distal end of the wing, wherein the second winglet includes at least a second control surface at a second trailing edge of the second winglet. First and second wing may include any wing described in this disclosure, including with reference to FIGS. 1-4. First and second winglet may include any winglet described in this disclosure, including with reference to FIGS. 1-4. first and second control surface may include any control surface described in this disclosure, including with reference to FIGS. 1-4.

With continued reference to FIG. 5, at step 505, method 500 may include moving, using at least a first actuator, at least a first control surface. In some cases, step 505 may include driving, using controller, at least a first actuator to move at least a first control surface. First actuator may include any actuator described in this disclosure, including with reference to FIGS. 1-4.

With continued reference to FIG. 5, at step 510, method 500 may include moving, using at least a second actuator, at least a second control surface. In some cases, step 510 may include driving, using controller, at least a first actuator to move at least a first control surface. Second actuator may include any actuator described in this disclosure, including with reference to FIGS. 1-4.

With continued reference to FIG. 5, at step 515 method 500 may include controlling, using a controller, each of at least a first actuator and at least a second actuator. Controller may include any controller, flight controller, and/or computing device described in this disclosure, including with reference to FIGS. 1-4 and 6.

Still referring to FIG. 5, in some embodiments, method 500 may additionally include controlling, using controller, at least a first control surface, and at least a second control surface, each of at least a first actuator and at least a second actuator to reduce drag. Drag may include any drag described in this disclosure, including with reference to FIGS. 1-4.

Still referring to FIG. 5, in some embodiments, method 500 may additionally include controlling, using controller, and one or more of at least a first control surface and at least a second control surface, one or more of at least a first actuator and at least a second actuator to introduce a yaw moment. Yaw moment may include any force or moment inducing yaw described in this disclosure, including with reference to FIGS. 1-4.

Still referring to FIG. 5, in some embodiments, method 500 may additionally include controlling, using controller, and one or more of at least a first control surface and at least a second control surface, one or more of at least a first actuator and at least a second actuator to introduce a side force. Side force may include any force described in this disclosure, including with reference to FIGS. 1-4.

Still referring to FIG. 5, in some embodiments, method 500 may additionally include controlling, using controller, at least a first control surface, and at least a second control surface, each of at least a first actuator and at least a second actuator to increase drag.

Still referring to FIG. 5, in some embodiments, method 500 may additionally include controlling, using controller, at least a first control surface, and at least a second control surface, each of at least a first actuator and at least a second actuator to adjust wing bending. Wing bending may include any bending described in this disclosure, including with reference to FIGS. 1-4. Still referring to FIG. 5, in some embodiments, at least a first control surface and/or at least a second control surface each comprise at least two control surfaces. In some cases, method 500 may additionally include controlling, using controller and one or more of at least a first actuator and at least a second actuator, to move at least two control surfaces in opposite directions and increase drag.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 6:
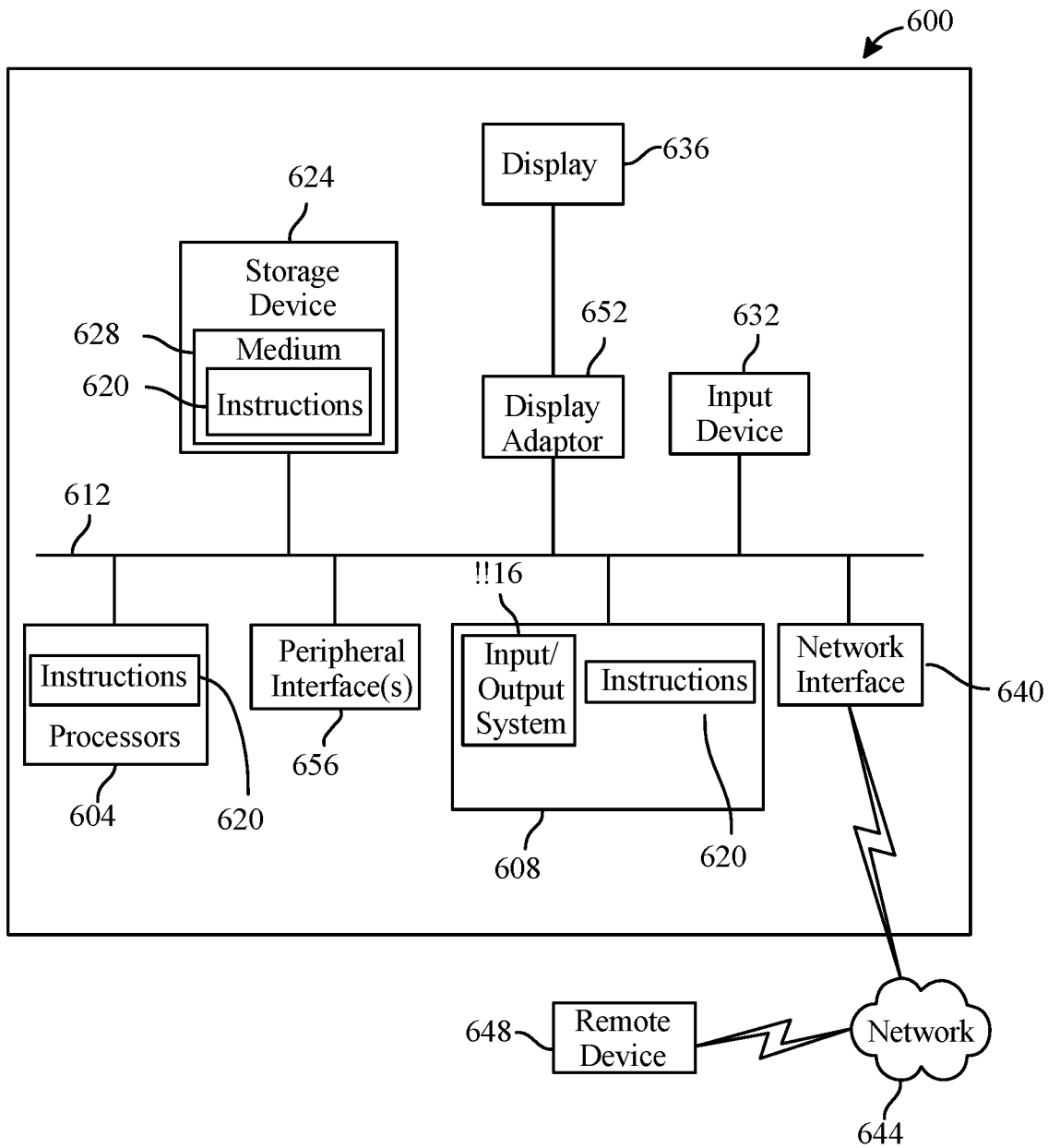
FIG. 6 is a block diagram of a computing system that can be used to implement any one or more of the methodologies disclosed herein and any one or more portions thereof.

FIG. 6 shows a diagrammatic representation of one embodiment of a computing device in the exemplary form of a computer system 600 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 600 includes a processor 604 and a memory 608 that communicate with each other, and with other components, via a bus 612. Bus 612 may include any of several types of bus structures including, but not limited to, a memory bus, a memory controller, a peripheral bus, a local bus, and any combinations thereof, using any of a variety of bus architectures.

Processor 604 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 604 may be organized according to Von Neumann and/or Harvard architecture as a non-limiting example. Processor 604 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating-point unit (FPU), and/or system on a chip (SoC).

Memory 608 may include various components (e.g., machine-readable media) including, but not limited to, a random-access memory component, a read only component, and any combinations thereof. In one example, a basic input/output system 616 (BIOS), including basic routines that help to transfer information between elements within computer system 600, such as during start-up, may be stored in memory 608. Memory 608 may also include (e.g., stored on one or more machine-readable media) instructions (e.g., software) 620 embodying any one or more of the aspects and/or methodologies of the present disclosure. In another example, memory 608 may further include any number of program modules including, but not limited to, an operating system, one or more application programs, other program modules, program data, and any combinations thereof.

Computer system 600 may also include a storage device 624. Examples of a storage device (e.g., storage device 624) include, but are not limited to, a hard disk drive, a magnetic disk drive, an optical disc drive in combination with an optical medium, a solid-state memory device, and any combinations thereof. Storage device 624 may be connected to bus 612 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 624 (or one or more components thereof) may be removably interfaced with computer system 600 (e.g., via an external port connector (not shown)). Particularly, storage device 624 and an associated machine-readable medium 628 may provide nonvolatile and/or volatile storage of machine-readable instructions, data structures, program modules, and/or other data for computer system 600. In one example, software 620 may reside, completely or partially, within machine-readable medium 628. In another example, software 620 may reside, completely or partially, within processor 604.

Computer system 600 may also include an input device 632. In one example, a user of computer system 600 may enter commands and/or other information into computer system 600 via input device 632. Examples of an input device 632 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 632 may be interfaced to bus 612 via any of a variety of interfaces (not shown) including, but not limited to, a serial interface, a parallel interface, a game port, a USB interface, a FIREWIRE interface, a direct interface to bus 612, and any combinations thereof. Input device 632 may include a touch screen interface that may be a part of or separate from display 636, discussed further below. Input device 632 may be utilized as a user selection device for selecting one or more graphical representations in a graphical interface as described above.

A user may also input commands and/or other information to computer system 600 via storage device 624 (e.g., a removable disk drive, a flash drive, etc.) and/or network interface device 640. A network interface device, such as network interface device 640, may be utilized for connecting computer system 600 to one or more of a variety of networks, such as network 644, and one or more remote devices 648 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 644, may employ a wired and/or a wireless mode of communication. In general, any network topology may be used. Information (e.g., data, software 620, etc.) may be communicated to and/or from computer system 600 via network interface device 640.

Computer system 600 may further include a video display adapter 652 for communicating a displayable image to a display device, such as display device 636. Examples of a display device include, but are not limited to, a liquid crystal display (LCD), a cathode ray tube (CRT), a plasma display, a light emitting diode (LED) display, and any combinations thereof. Display adapter 652 and display device 636 may be utilized in combination with processor 604 to provide graphical representations of aspects of the present disclosure. In addition to a display device, computer system 600 may include one or more other peripheral output devices including, but not limited to, an audio speaker, a printer, and any combinations thereof. Such peripheral output devices may be connected to bus 612 via a peripheral interface 656. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An aircraft for transonic flight comprising:
    a fuselage extending to a back portion lacking a vertical tailfin, wherein the back portion comprises a first main body control surface and a second main body control surface;
    a propulsor configured to generate thrust;
    a first substantially swept wing having a first winglet disposed beyond the back portion of the fuselage, the first winglet comprising a carbon-fiber composite with carbon fibers between 5-10 micrometers at a distal end of the wing, wherein the first winglet comprises at least a first control surface including a first trailing edge of the first winglet, wherein the fuselage and a leading edge of the first substantially swept wing creates a continuous curvilinear geometry;
    a second substantially swept wing having a second winglet disposed beyond the back portion of the fuselage, the second winglet comprising a carbon-fiber composite with carbon fibers between 5-10 micrometers at a distal end of the wing, wherein the second winglet comprises at least a second control surface including a second trailing edge of the second winglet, wherein the fuselage and a leading edge of the second substantially swept wing creates a continuous curvilinear geometry;
    wherein the at least a first control surface and the at least a second control surface are independently movable and the at least a first control surface and the at least a second control surface each comprise at least two control surface segments, wherein each of the at least two control surface segments are independently positioned;
    a first actuator configured to move the at least first control surface; and a second actuator configured to move the at least second control surface, wherein an actuator of the first actuator and second actuator comprises a pneumatic actuator.

2. The aircraft of claim 1, further comprising a blended wing body.

3. The aircraft of claim 1, wherein the at least a first control surface and the at least a second control surface each comprise a rudder.

4. The aircraft of claim 1, further comprising:
at least a first actuator configured to move the at least a first control surface;
at least a second actuator configured to move the at least a second control surface; and
a controller configured to control each of the at least a first actuator and the at least a second actuator.

5. The aircraft of claim 4, wherein the controller is further configured to control each of the at least a first actuator and the at least a second actuator to reduce drag using the at least a first control surface and the at least a second control surface.

6. The aircraft of claim 4, wherein the controller is further configured to control one or more of the at least a first actuator and the at least a second actuator to introduce a yaw moment using one or more of the at least a first control surface and the at least a second control surface.

7. The aircraft of claim 4, wherein the controller is further configured to control one or more of the at least a first actuator and the at least a second actuator to introduce a side force using one or more of the at least a first control surface and the at least a second control surface.

8. The aircraft of claim 4, wherein the controller is further configured to control each of the at least a first actuator and the at least a second actuator to adjust wing bending using the at least a first control surface and the at least a second control surface.

9. The aircraft of claim 4, wherein the controller is further configured to control each of the at least a first actuator and the at least a second actuator to increase drag using the at least a first control surface and the at least a second control surface.

10. The aircraft of claim 9, wherein:
the at least a first control surface and the at least a second control surface each comprise at least two control surface segments; and
the controller is further configured to increase drag by moving the at least two control surface segments in opposite directions.

11. A method of using an aircraft for transonic flight comprising a fuselage extending to a back portion lacking a vertical tailfin, wherein the back portion comprises a first main body control surface and a second main body control surface; a propulsor configured to generate thrust; a first substantially swept wing having a first winglet extending beyond the back portion of the fuselage, the first winglet comprising a carbon-fiber composite with carbon fibers between 5-10 micrometers at a distal end of the wing, wherein the first winglet comprises at least a first control surface including a first trailing edge of the first winglet, wherein the fuselage and a leading edge of the first substantially swept wing creates a continuous curvilinear geometry and a second substantially swept wing having a second winglet extending beyond the back portion of the fuselage, the second winglet comprising a carbon-fiber composite with carbon fibers between 5-10 micrometers at a distal end of the wing, wherein the second winglet comprises at least a second control surface including a second trailing edge of the second winglet, wherein the fuselage and a leading edge of the second substantially swept wing creates a continuous curvilinear geometry, wherein the at least a first control surface and the at least a second control surface are independently movable and the at least a first control surface and the at least a second control surface each comprise at least two control surface segments, wherein each of the at least two control surface segments are independently positioned, the method comprising:
driving, by a controller incorporated in the aircraft, at least a first actuator to move the at least a first control surface;
driving, by the controller, at least a second actuator to move the at least a second control surface; and
wherein an actuator of the at least first actuator and the at least second actuator comprises a pneumatic actuator.

12. The method of claim 11, wherein driving the at least a first actuator and the at least a second actuator further comprises driving each of the at least a first actuator and the at least a second actuator to reduce drag.

13. The method of claim 11, further comprising driving, using the controller, one or more of the at least a first actuator and the at least a second actuator to move one or more of the at least a first control surface and the at least a second control surface to introduce a yaw moment.

14. The method of claim 11, further comprising driving, using the controller, one or more of the at least a first actuator and the at least a second actuator to move one or more of the at least a first control surface and the at least a second control surface to introduce a side force.

15. The method of claim 11, further comprising driving, using the controller, the at least a first actuator and the at least a second actuator to move the at least a first control surface and the at least a second control surface to increase drag.

16. The method of claim 11, further comprising driving, using the controller, the at least a first actuator and the at least a second actuator to move the at least a first control surface and the at least a second control surface to adjust wing bending.

17. The method of claim 11, further comprising, driving, using the controller, the at least a first actuator and the at least a second actuator to move the at least a first control surface and the at least a second control surface to increase drag.

18. The method of claim 17, wherein the method further comprises driving, by the controller, at least one of the at least a first actuator and the at least a second actuator to move the at least two control surface segments in opposite directions and increase drag.

19. The aircraft of claim 1, wherein the fuselage comprises a nose portion, wherein the nose portion comprises a cockpit.

20. The aircraft of claim 19, wherein the nose portion of the fuselage and a leading edge of a substantially swept wing creates a continuous curvilinear geometry.

* * * * *